US011250641B2

(12) United States Patent
Li et al.

(10) Patent No.: US 11,250,641 B2
(45) Date of Patent: Feb. 15, 2022

(54) SYSTEM AND METHODS FOR MATING VIRTUAL OBJECTS TO REAL-WORLD ENVIRONMENTS

(71) Applicant: Dassault Systemes SolidWorks Corporation, Waltham, MA (US)

(72) Inventors: Yun Li, Waltham, MA (US); Yaqin Huang, Waltham, MA (US); Eric Hasan, Westford, MA (US)

(73) Assignee: Dassault Systemes SolidWorks Corporation, Waltham, MA (US)

( * ) Notice: Subject to any disclaimer, the term of this patent is extended or adjusted under 35 U.S.C. 154(b) by 66 days.

(21) Appl. No.: 16/782,278

(22) Filed: Feb. 5, 2020

(65) Prior Publication Data

US 2020/0258315 A1 Aug. 13, 2020

Related U.S. Application Data

(60) Provisional application No. 62/803,367, filed on Feb. 8, 2019.

(51) Int. Cl.
| | |
|---|---|
| *G06T 19/20* | (2011.01) |
| *G06T 3/60* | (2006.01) |
| *G06T 11/20* | (2006.01) |
| *G06T 17/20* | (2006.01) |
| *G06T 19/00* | (2011.01) |

(52) U.S. Cl.
CPC .............. *G06T 19/20* (2013.01); *G06T 3/60* (2013.01); *G06T 11/20* (2013.01); *G06T 17/20* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 2012/0249741 | A1* | 10/2012 | Maciocci | .............. G06T 15/503 348/46 |
| 2016/0232713 | A1 | 8/2016 | Lee | |
| 2017/0270715 | A1* | 9/2017 | Lindsay | .................... G06T 7/70 |
| 2018/0082475 | A1* | 3/2018 | Sharma | ................... G06F 3/147 |
| 2018/0300952 | A1* | 10/2018 | Evans | ................. G06F 3/04845 |
| 2019/0134914 | A1* | 5/2019 | Gonzalez | ................ G06F 30/00 |

OTHER PUBLICATIONS

Extended European Search Report for EP 20155944 dated Jun. 8, 2020.

\* cited by examiner

*Primary Examiner* — Jennifer Mehmood
*Assistant Examiner* — Jed-Justin Imperial
(74) *Attorney, Agent, or Firm* — Sheehan Phinney Bass & Green PA

(57) ABSTRACT

Mating virtual objects in virtual reality environment, involves generating a bounding box having a plurality of faces corresponding to a plurality of exterior surfaces of a subject virtual object. A spatial mesh corresponding to surfaces of the real world environment is generated. A magnetic mate is generated to initially align a bounding box first face to a first spatial mesh surface. A shadow mate is provided between a bounding box second face and a second spatial mesh surface, by projecting a virtual ray from the subject virtual object bounding box second face toward the second spatial mesh surface, determining a mate point corresponding to an intersection of the virtual ray and the second spatial mesh surface, and displaying a mating button in the virtual reality environment at the mate point.

9 Claims, 18 Drawing Sheets
(13 of 18 Drawing Sheet(s) Filed in Color)

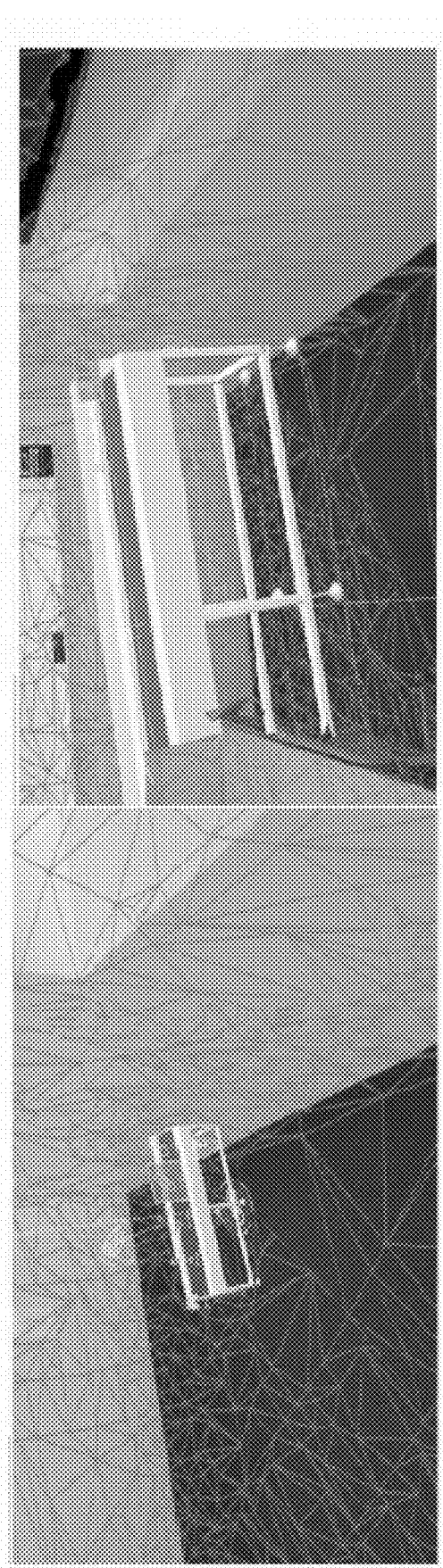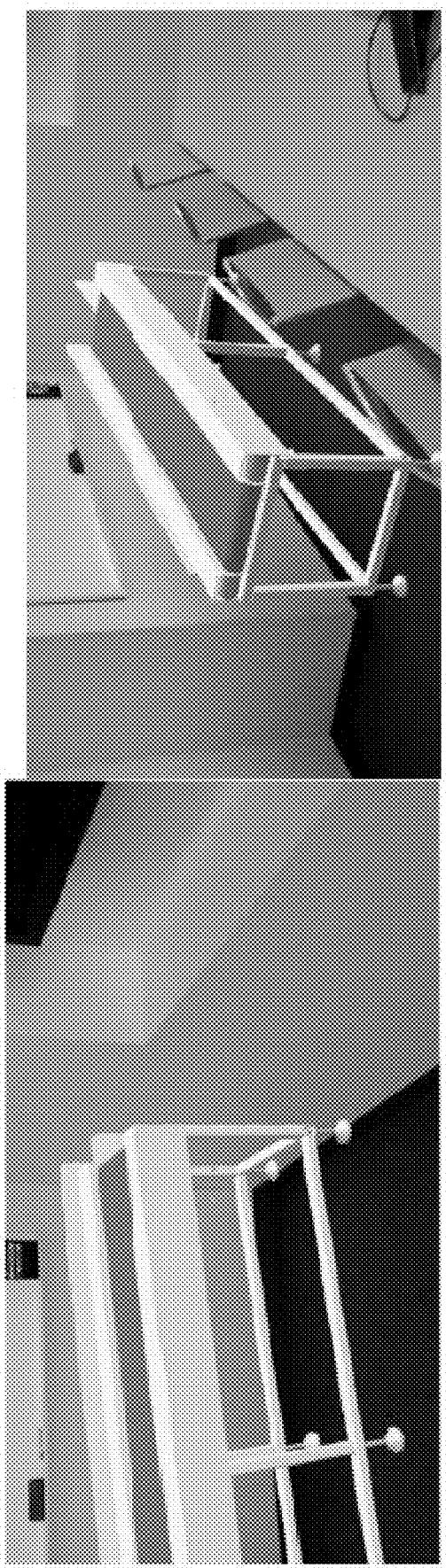
FIG. 9A
FIG. 9B
FIG. 9C
FIG. 9D

```
public void PlaceOffsetMateHitIndicator(Vector3 rayPos, Vector3 rayDir, int i)
{
    RaycastHit[] hits = Physics.RaycastAll(rayPos, rayDir, 10.0F, layer_mask);
```

FIG. 12A

```
public void PlaceOffsetMateHitIndicator(Vector3 rayPos, Vector3 rayDir, int i)
{
    RaycastHit[] hits = Physics.RaycastAll(rayPos, rayDir, 10.0F, layer_mask);
```

FIG. 12B

```
public void PlaceOffsetMateHitIndicator(Vector3 rayPos, Vector3 rayDir, int i)
{
    RaycastHit[] hits = Physics.RaycastAll(rayPos, rayDir, 10.0F, layer_mask);
    //For now only c
    if (hits.length !
    {
        float minDista
        int closetHit
        for (int ind =
        {
            float dist
```

FIG. 12C

```
RaycastHit hit = hits[closetHit];
                  ▲ ...
                    ▸ 🔧 barycentricCoordinate  "(0.0, 0.8, 0.2)"
if (GravityMod     ▸ 🔧 collider               "SpatialMappingTestPlane4 (UnityEngine.MeshCollider)"
{                  ▸ 🔧 distance               6.160083
                   ▸ 🔧 lightmapCoord          "(0.9, 0.6)"
    isBounding     ▸ 🔧 normal                 "(0.0, 0.0, 1.0)"
    boundingBo     ▸ 🔧 point                  "(-1.0, -0.2, -5.0)"
                   ▸ 🔧 rigidbody              null
                   ▸ 🔧 textureCoord           "(0.9, 0.6)"
    if ((offse     ▸ 🔧 textureCoord2          "(0.9, 0.6)"                                   d c
    {              ▸ 🔧 transform              "SpatialMappingTestPlane4 (UnityEngine.Transform)"
        if (of     ▸ 🔧 triangleIndex          133
                   ▸ ● Non-Public members Destroy(offsetMateIndicators[i]);
```

FIG. 12D

SYSTEM AND METHODS FOR MATING VIRTUAL OBJECTS TO REAL-WORLD ENVIRONMENTS

CROSS-REFERENCE TO RELATED APPLICATIONS

This application claims the benefit of U.S. Provisional Patent Application Ser. No. 62/803,367, filed Feb. 8, 2019, entitled "System and Methods for Mating Virtual Objects to Real World Environments," which is incorporated by reference herein in its entirety.

FIELD OF THE INVENTION

The present invention relates to graphic processing, and more particularly, is related to scaling/positioning of virtual objects in a mixed reality environment.

BACKGROUND OF THE INVENTION

A mixed reality environment refers to a virtual reality (VR) environment that incorporates one or more aspects of the real-world environment of the user of a virtual reality device. In a mixed reality environment, the use of head-mounted devices (for a non-limiting example, Microsoft's HoloLens) enables the head of a user to function like a camera. While this technology provides users the freedom to view a virtual object, for example, an assembly or model naturally by walking around the virtual object, certain interactions may create challenges for users manipulating the virtual object assembly that they are viewing.

The challenges include but are not limited to:
(1) Environment Constraints: Access to angles of the virtual object that are difficult for people to reach in the real world. This is especially true when one mate (anchor point) between the virtual object and the real-world environment has been established, as the mating may restrict the virtual object so that the virtual object may be cumbersome to view and/or manipulate, requiring the user to assume difficult/uncomfortable positions in the real-world (RW) environment in order to further interact with the virtual object. For example, as shown in FIG. 1, the user 110 must lie on the floor 125 of the RW environment 100 with the headset in order to view and interact with the desired portion of the virtual object 130 (here, the bottom surface of the virtual object 130).
(2) Inefficient gesture Interactions: Certain human interaction with the VR environment, such as the gaze+air tap gesture, may be difficult for users to master and/or cause fatigue. Therefore it may be preferable to minimize the number of steps to manipulate the assembly.
(3) The VR size variance, mesh variance and origin difference of the loaded assembly may significantly affect the efficiency of alignment or mate to the real-world environment.

A current process for mating virtual objects to their real-world environment may be, for example:
(1) The user, wearing a headset, selects a face on the virtual assembly, then selects another real-world plane that the user intends to mate the virtual assembly to. The user then confirms the mating method through the user interface (UI) of the headset. If some locations in the virtual assembly are hard for the user to reach, the user may use a ladder or lie down in the real world in order to reach these locations. If it is difficult for the user to aim for a precise location because of unstable movement of the camera/human head, the user may compensate by attempting to stabilize the camera/head.
(2) The user manually measures a distance between a real-world object/surface and the virtual object by first selecting (clicking on) a surface of the virtual object and then selecting a real-world surface, and then moves the virtual object to adjust the distance.
(3) The user then manually inputs the offset distance via virtual keyboard, which might be cumbersome when using a mixed reality headset.

Therefore, there is a need to address one or more of the abovementioned issues.

SUMMARY OF THE INVENTION

Embodiments of the present invention provide a system and method for mating virtual objects to real-world environments. Briefly described, the present invention is directed to mating virtual objects in virtual reality environment. A bounding box is having a plurality of faces corresponding to a plurality of exterior surfaces of a subject virtual object is generated. A spatial mesh corresponding to surfaces of the real world environment is generated. A magnetic mate initially aligns a bounding box first face to a first spatial mesh surface. A shadow mate is provided between a bounding box second face and a second spatial mesh surface, by projecting a virtual ray from the subject virtual object bounding box second face toward the second spatial mesh surface, determining a mate point corresponding to an intersection of the virtual ray and the second spatial mesh surface, and displaying a mating button in the virtual reality environment at the mate point.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The patent or application file contains at least one drawing executed in color. Copies of this patent or patent application publication with color drawings(s) will be provided by the office upon request and payment of the necessary fee.

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

FIG. 9A-D illustrate user interface objects of embodiments.

FIG. 12A is a screen shot of an exemplary API call of Physics.RaycastAll input ray origin position.

FIG. 12B is a screen shot of an exemplary API call of Physics.RaycastAll input ray direction.

FIG. 12C is a screen shot of an exemplary API call of Physics.RaycastAll output RaycastHit list (example point and normal of the hit result).

FIG. 12D is a screen shot of an exemplary hit point data (include normal and position) structure.

DETAILED DESCRIPTION

Figure 1:
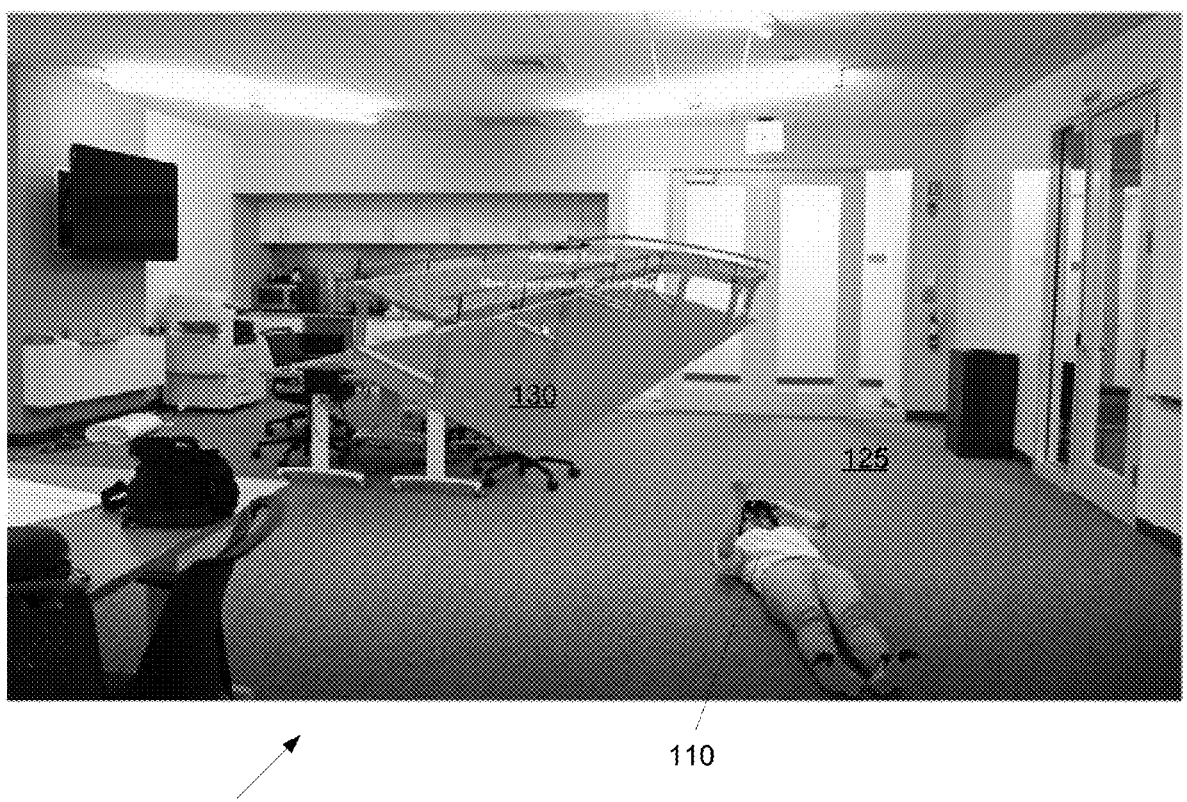
FIG. 1 is an illustration of user with a VR headset in a real-world environment interacting with a virtual object.

The following definitions are useful for interpreting terms applied to features of the embodiments disclosed herein, and are meant only to define elements within the disclosure.

As used within this disclosure, "mixed reality" generally refers to an interaction between a virtual reality environment and the real world environment. Depending upon the context, a mixed reality environment may be referred to as any of mixed reality, virtual reality, and augmented reality, among others.

As used within this disclosure, a "mixed reality headset" generally refers to any headset device that has the ability to detect a real physical environment and generate a representation of physical environment data. As noted above, such devices may be referred to as one or more of mixed reality, virtual reality, and augmented reality. For example, different manufactures of such devices may use different terms in an effort to differentiate their products. For example, Microsoft uses both Virtual Reality (Dreamwalker) headsets and Holo-Lens as Mixed Reality devices. Historically, a distinction between such headsets has been the ability to let a user see the real physical environment. If the user could not see the physical environment, the headset was referred to as a virtual reality headset. If the user could see the physical environment, then it was an Augmented Reality headset. More recently, however, the distinction has blurred as headsets referred to as virtual reality headset have begun to include cameras enabling the user to see the real physical environment on Virtual Reality devices. Herein, Mixed Reality/Virtual Reality/Augmented Reality headset all refer to a viewing device that detects and generates a representation of the real physical world.

As used herein, "Collide," "Collision," generally refer to actions associated with the Unity Engine class/component/scripts called Collider, which belong to the Physical Engine part. Collider detects whether a first object intersects a second another object mathematically. Collisions supported by Unity include box, sphere, capsule, and mesh (mesh means it is close to the shape of the object by using small triangles). MRTK attaches the collider component to objects (like cursor) and set its center size. Under the embodiments, the collider component may be attached to the Mate button and set its center and size. The Physical Engine performs corresponding calculations and broadcasts/sends a Unity event to MRTK. After MRTK receives the event from Unity, MRTK then fires an event in its own type and broadcasts/sends to scripts of the embodiments, providing an alert that the cursor has hit ("collided with") something that has a collider.

As used within this disclosure, "Gravity Mode" refers to a configuration setting for aligning object in a mixed reality environment. Gravity Mode may be used to resolve some noise/errors between the real physical environment and the Spatial Mapping mesh. For example, in a real world environment the wall and floor provide an absolute horizontal/vertical reference, but the associated spatial mapping may not be absolutely horizontal/vertical. For example, noise/errors may result in deviation in points on the Spatial Mapping mesh, resulting in an incorrect normal vector and an incorrect corresponding position of the hit point. Since mixed reality users generally want to align model to walls and floors, Gravity Mode is a user option that helps minimize the noise/errors for mate. Under the embodiments the difference between Gravity Mode off/on is whether the hit normal data is used directly or pre-processed according to Gravity Mode.

As used herein, a "frame" is a time reference used in graphics processing. For example, a frame refers to the state of a rendered VR image at a given moment in time. Just as a video is made of thousands of images played sequentially, the VR may also be rendered with sequential images, although unlike video VR rendering may not be time limited. For every rendered image, a rendering system calculates and updates data for the offsetMateIndicator and render pixels on the rendered image to represent the offsetMateIndicator. The rendered image is refreshed at certain frequency ("frame rate").

As used within this disclosure, "model," "assembly" and "virtual object" may interchangeably be used to refer to the subject being generated/manipulated by a VR headset.

Assembly: A document in which parts, features, and other assemblies (subassemblies) are mated together. Parts and subassemblies can exist in documents separate from the assembly. For example, in an assembly, a piston can be mated to other parts, such as a connecting rod or cylinder. This assembly can then be used as a subassembly in an assembly of an engine.

Body: A solid body includes topological data and geometric data. The topological data (e.g., faces, edges, and vertices) in a solid body have corresponding geometric data in the same solid body. Each vertex corresponds to a point. Each edge corresponds to a curve. Each face corresponds to a surface. An example multi-body part for a wheel can include an axle body, rim body, and a number of spoke bodies to connect the axle and rim bodies.

Component: Any part or subassembly within an assembly.

Edge: A single outside boundary of a feature.

Entity: A discrete element, such a face, edge, vertex, etc.

Face: A selectable area (planar or otherwise) of a model or surface with boundaries that help define the shape of the model or surface. For example, a rectangular solid has six faces, and a cylindrical solid has three faces.

Feature: An individual shape that, combined with other features, makes up a part or assembly.

Mate: A geometric relationship between entities (e.g., parts or bodies) in an assembly. Example mates include angle, coincident, concentric, distance, parallel, perpendicular, and tangent. Mate may also refer to a common reference point between a virtual object and a real world (RW) environment.

Reference Plane: A plane used as a reference to apply constraints.

Part: A single 3D object made up of features. A part can include multiple bodies. A part can become a component in an assembly. Examples of parts include, for example, a bolt, pin, and plate.

Plane: A flat construction geometry.

Point: A singular location in a 3D model.

As used within this disclosure, a "ray" refers to a mathematical concept indicating a semi-infinite portion of a line having a start point ("origin") and a direction. Therefore, a ray is defined by its start point coordinate and a direction, and is thus akin to a vector. In the described embodiments, a ray is visually represented by a ruler, and for clarity, in the drawings depictions of rays and rulers are represented using the same element label. When describing a ray/ruler, "normal" refers to a unit vector having a direction orthogonal to a plane that includes the ray origin, or a parallel plane.

Subassembly: An assembly that is part of a larger assembly. For example, a steering mechanism of a car is a subassembly of the car.

Surface: A zero-thickness planar or 3D entity with edge boundaries.

Vertex: A point at which two or more edges intersect. Vertices can be selected for sketching, dimensioning, and many other CAD operations.

As used herein, "parent," and "child" refer to a logical relationship between objects, for example, objects in the Unity Engine. As an example, in the real world, a tree may have branches and leaves, which may be thought of as sub components of the tree. In the given parent/child relationship, the parent in this case would be the tree and the leaves and branches would be the children. If a user moves/rotates/scales the tree, all the branches and leaves move/rotate/scale with the tree, such that in the world coordinate, the position vector change for the tree is the same for all its branches and leaves. Translating the tree by one meter in the north direction, all the branches and leaves also move one meter in the north direction. Relative to the coordinates of the tree, the local positions of the branches and leaves stay the same. A move/rotate/scale of a parent, automatically performs the same operation for each child. In terms of the embodiments described herein, moving an instantiated bounding box face by one meter, also moves the virtual object by one meter. In general, the movement (rotation/translation) of the child objects is automatically handled by Unity according to manipulation of the parent object. In Unity, any object may be assigned to another object as a child/parent. If the parent of an object is NULL, the parent of that object is the scene.

Reference will now be made in detail to embodiments of the present invention, examples of which are illustrated in the accompanying drawings. Wherever possible, the same reference numbers are used in the drawings and the description to refer to the same or like parts.

Embodiments of the present invention address environmental constraints that VR users may experience mating virtual objects to real-world surfaces. As described above, a user in a RW environment may have difficulty interacting with a virtual object in a mixed reality system if an appropriate positional relationship is not established between the virtual object in the virtual environment with respect to the RW environment. The embodiments described herein provide for improved mating of virtual objects to a RW environment in a mixed reality system, which at a high level encompasses:

(1) A magnetic mate for initial alignment of the VO to at least one RW environment surface;

(2) A projection of a virtual ray from each of several VO surfaces toward corresponding potential mate surfaces in the RW environment and indicating a mating button at a location of each potential mate point; and (3) Combining a measuring method and an offset mate from the projected virtual ray to present a graphical indication of setting the distance and alignment between the VO and the RW environment around it to the user, thus increasing efficiency, for example, for complicated floor planning scenarios.

Figure 2A:
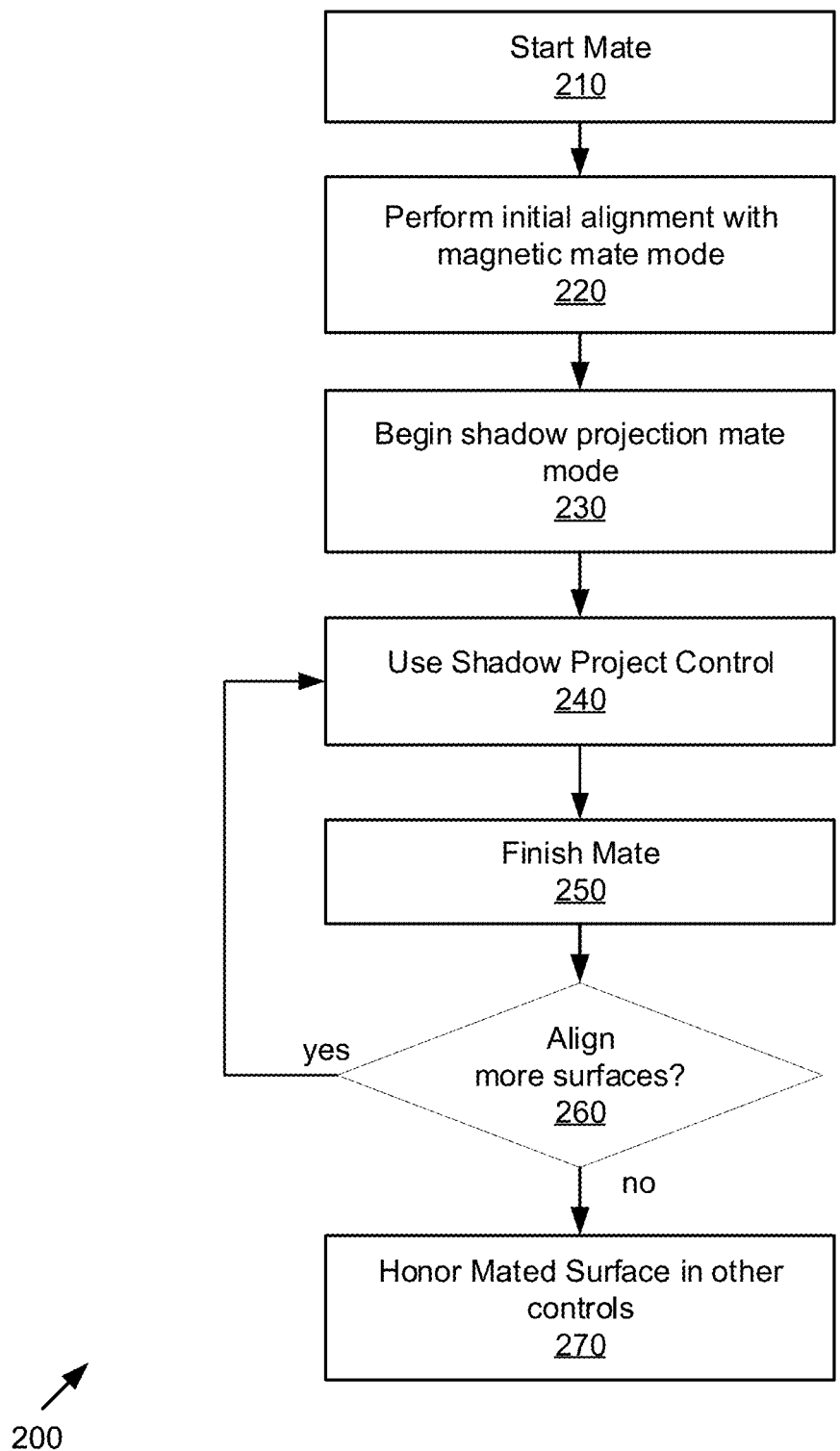
FIG. 2A is a flowchart of a first exemplary embodiment of a method for mating a virtual object to a real-world environment from a user perspective.

FIG. 2A is a flowchart of a first exemplary embodiment of a method 200 for mating a virtual object to a real-world environment from a user perspective. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

A description of the functionality of the system executing the method follows thereafter. The method 200 occurs in a Mixed Reality environment which supports the use of 3D models such a Microsoft's HoloLens.

Figure 2B:
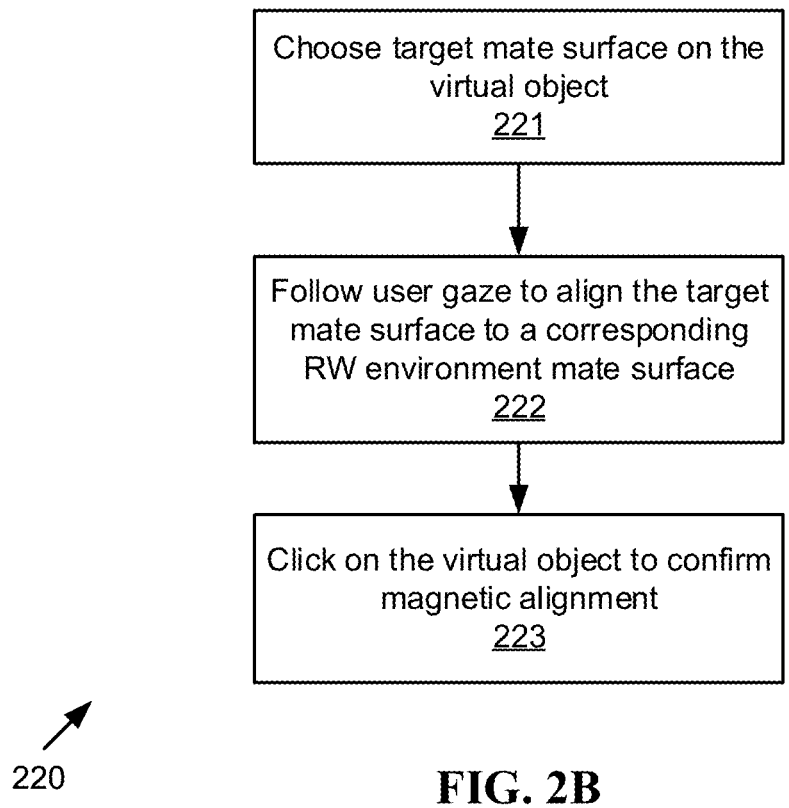
FIG. 2B is a flowchart showing a detail of the magnetic mate mode block of FIG. 2A.
Figure 2C:
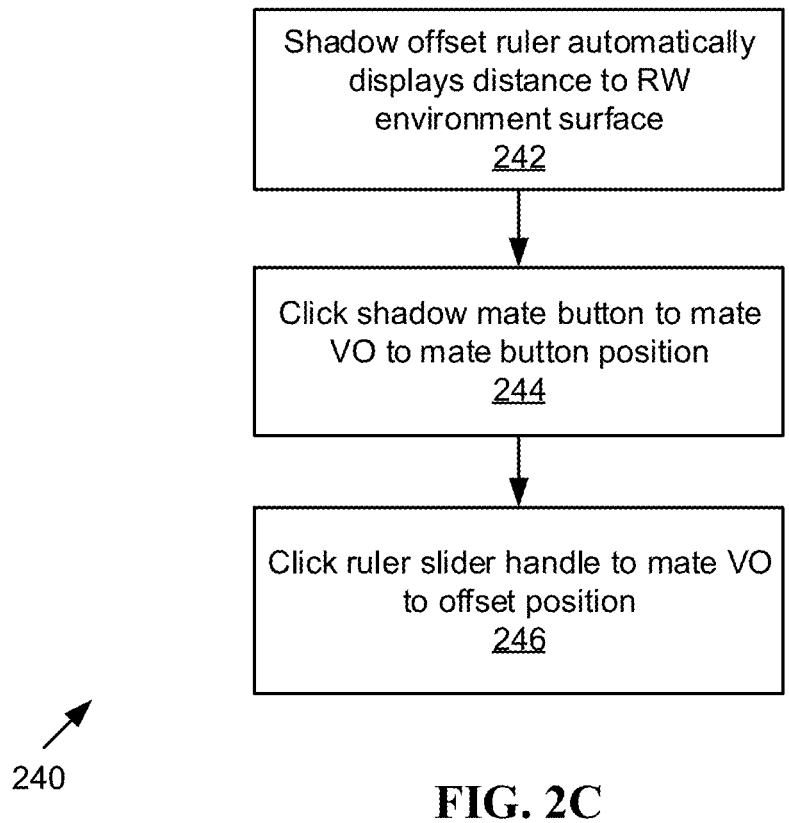
FIG. 2C is a flowchart showing a detail of the shadow control block of FIG. 2A.
Figure 3:
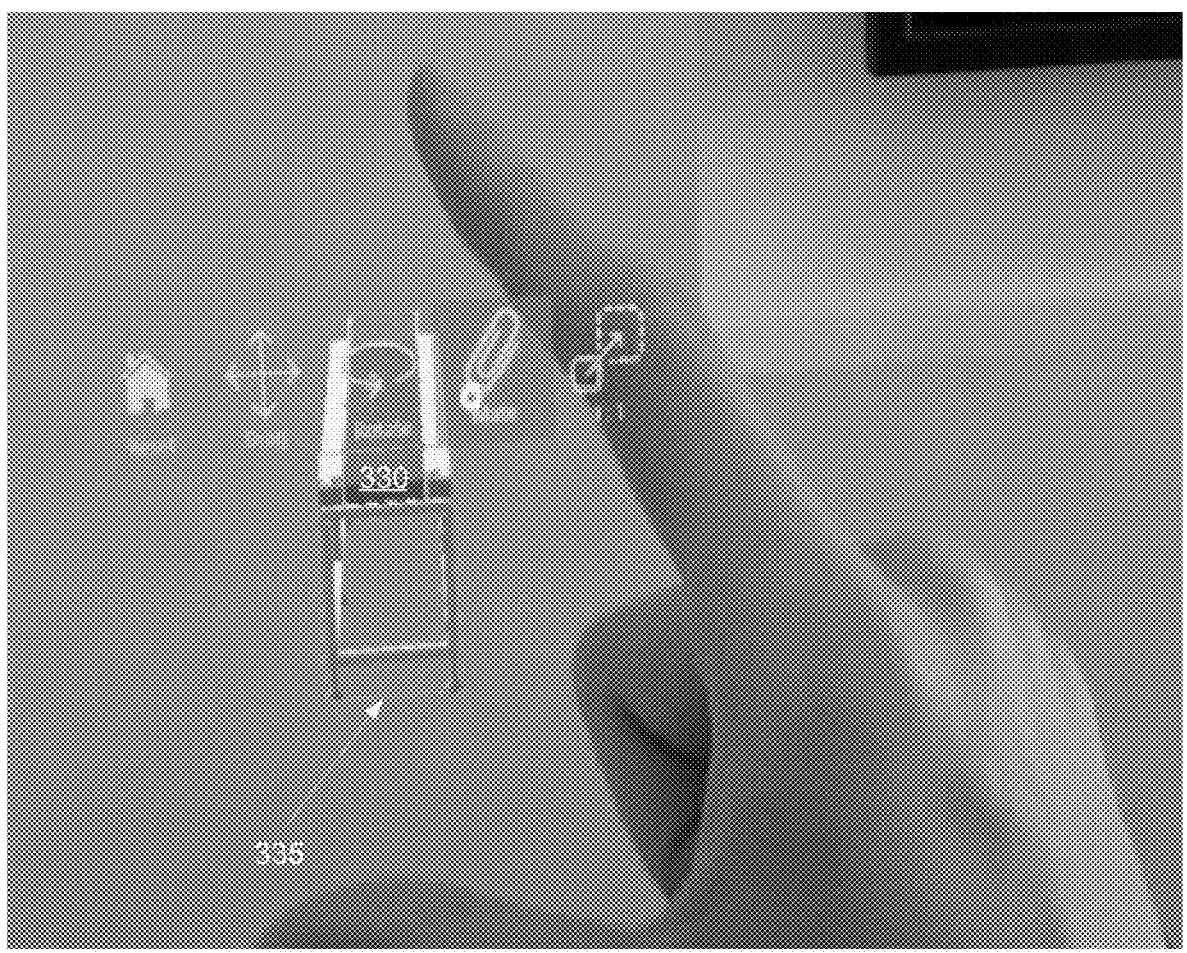
FIG. 3 is an illustration of mixed reality environment user interface.

FIG. 3 shows an example user interface for a Mixed Reality environment described by the flowcharts in FIGS. 2A-2C. As shown by FIG. 3, the user has access to commands to manipulate the virtual model uploaded into the Mixed Reality environment.

Returning to FIG. 2A, the user starts the mate process, as shown by block 210. When the mate process begins, the user selects a mate button, upon which the virtual object enters a mate mode, and the method begins execution of a magnetic mate mode, as shown by block 220. A detail of magnetic mate mode is shown in FIG. 2B. In magnetic mate mode, a first surface 335a of the virtual object 335 is selected and mated to a first RW surface. For example, it may be convenient to mate a bottom surface 335a of the virtual object 330 to the RW floor in the magnetic mate mode.

In mate mode, the HoloLens headset automatically conducts spatial mapping to gather real world environment surface data and continuously generates and updates a virtual spatial mapping mesh that represents real world surfaces. The visual representation of this spatial mapping can be seen in FIGS. 4A and 4B (and subsequent drawings) as blue triangles 410 representing surfaces of the real world environment. It should be noted that herein an interaction between a virtual object and a real world surface generally refer to an interaction between the virtual object and the virtual spatial mapping mesh 410 that represents a corresponding real world surface.

Figure 4A:
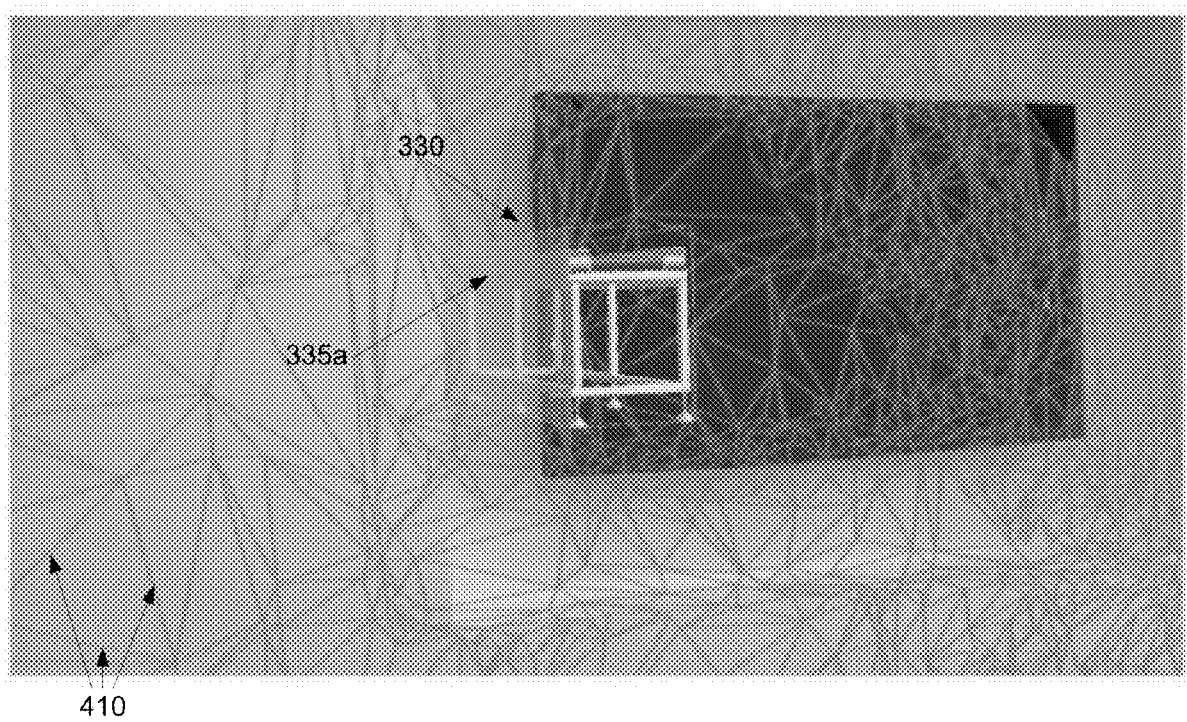
FIG. 4A shows a first virtual spatial mapping as visually represented to the user.
Figure 4B:
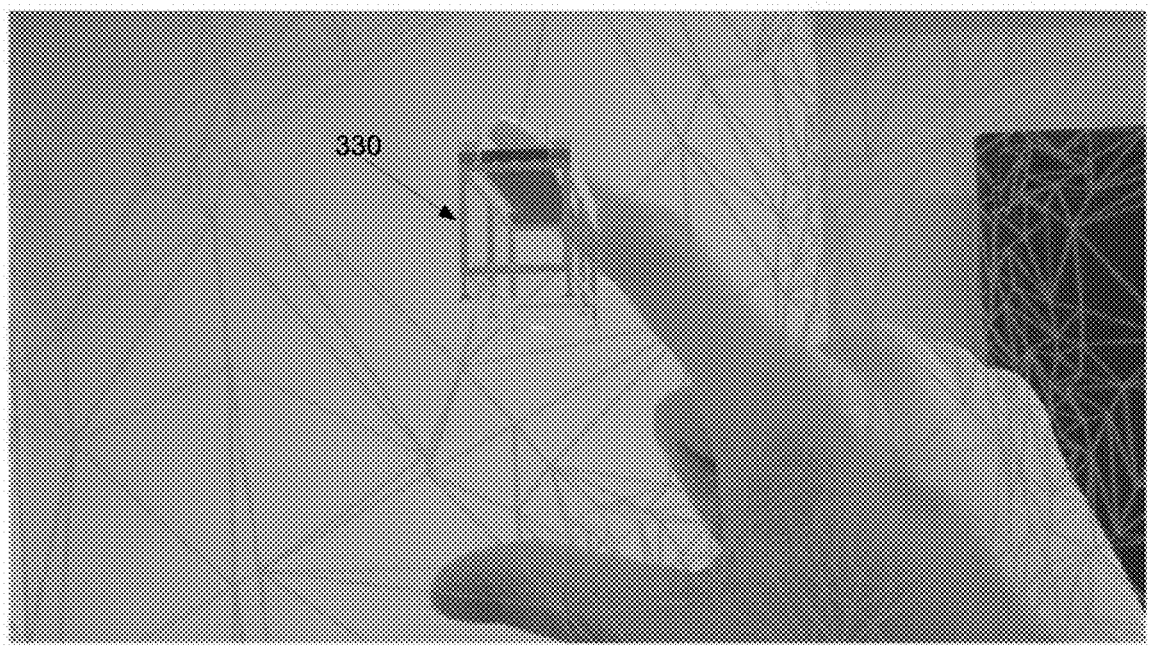
FIG. 4B shows a second virtual spatial mapping as visually represented to the user.

While in mate mode, a three-dimensional bounding box 335 is displayed (in green) around the virtual object 330 as shown in FIG. 3. For simplicity, the virtual object 330 used for this example may be represented as a six sided rectangular box 335. Initially the user selects only one bounding box face 335a from the six faces of the bounding box 335 to be (magnetically) mated with the RW environment as shown by block 221 (FIG. 2B). The selected bounding box face 335a is highlighted, as shown by FIG. 4A.

Figure 5A:
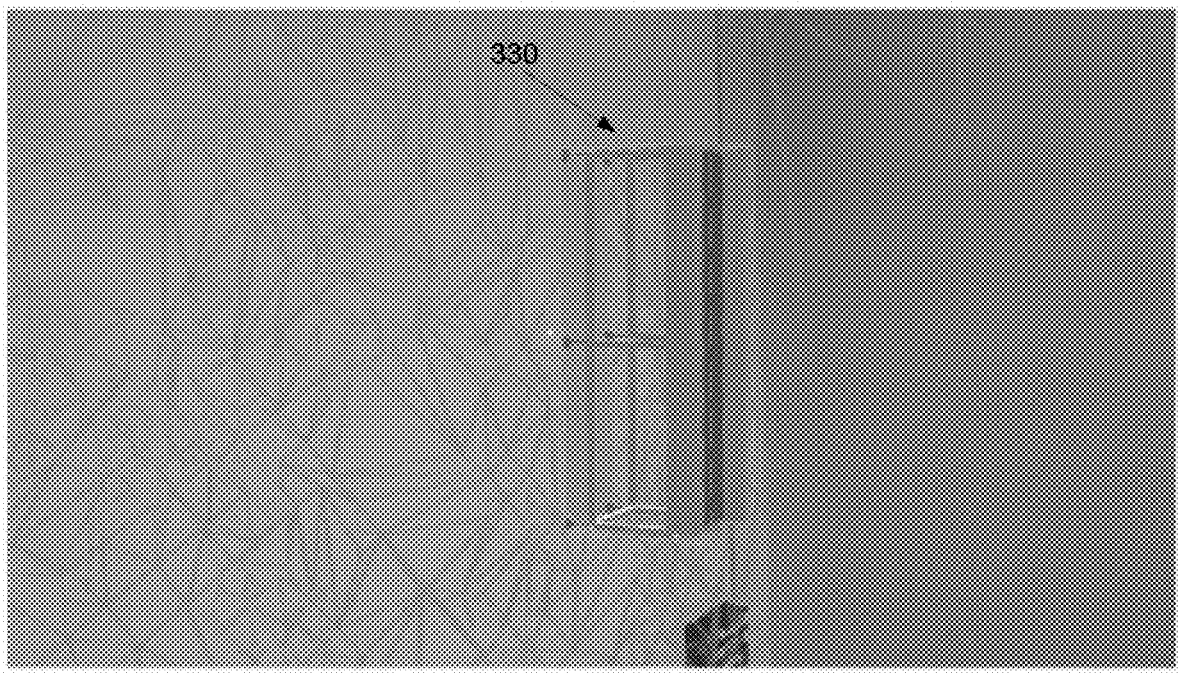
FIG. 5A illustrates a first user interaction in the user interface of the embodiments.
Figure 5B:
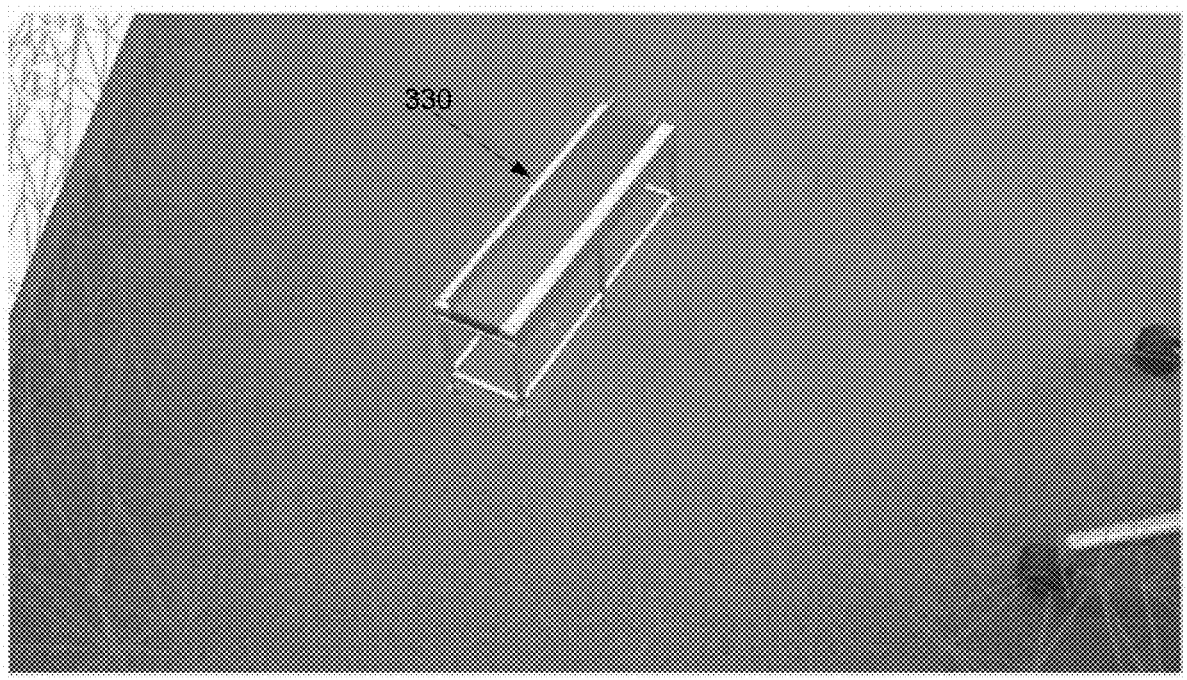
FIG. 5B illustrates a second user interaction in the user interface of the embodiments.

After one bounding box face 335a is selected, the app allows movement of the virtual object 330 by the user along the spatial mapping mesh 410, as shown by FIG. 5A. This is done using a ray whose starting position corresponding to a position of the head of the user and the ray direction corresponds to a gazing direction of the user. The ray intersects the mapping mesh 410 at a hit point on the mapping mesh corresponding to the gaze direction of the user, as shown by block 222 (FIG. 2B). The system calculates this ray hit point on the spatial mapping mesh 410 and moves the virtual object 330 in relation to the spatial mapping mesh 410 so that the center position of selected bounding box face 335a is mated at (is equal to) the position of ray hit point. The system also rotates the virtual object 330 so that a negative normal vector of the selected bounding box face 335a is equal to the normal vector of the ray hit point. The user may perform an 'air tap' gesture upon the virtual object 330 at any time so that the virtual object 330 is placed in certain position and rotation, as per block 223 and shown by FIG. 5B. At this point, the magnetic mode initial alignment is complete, and a shadow projection mate mode begins, as shown by block 230.

Figure 6A:
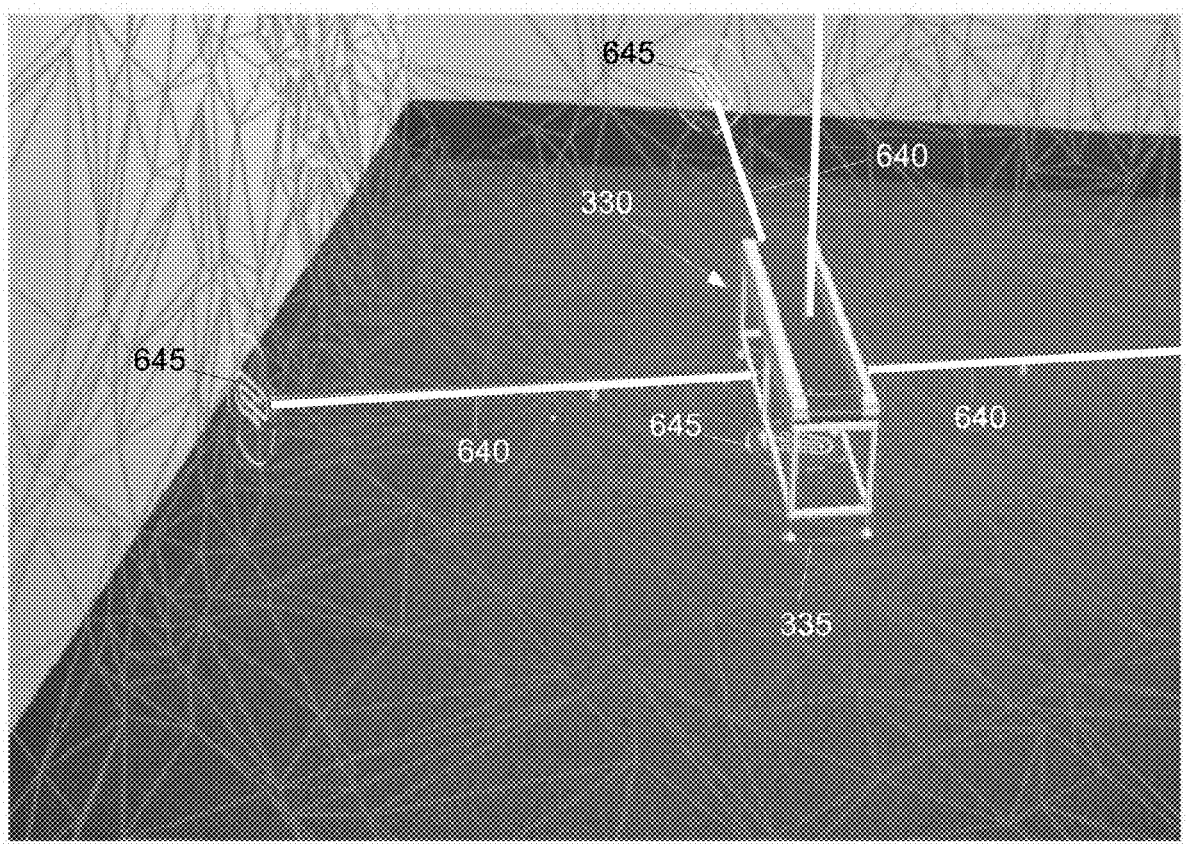
FIG. 6A illustrates virtual rays and other tools generated in the user interface of the embodiments.

After the initial magnetic mate of a first surface of the virtual object 330, the virtual object 330 is in a shadow project mode first position (both translational and rotational) to begin shadow projection mode, as shown by block 230. In shadow projection mode virtual rays are generated from the virtual object 330 to detect real world surfaces, and displayed graphically to the user as a ruler 640. In this example six virtual rays 640 are projected in six different directions corresponding to the center of the faces of the bounding box 335 as shown in FIG. 6A. Alternatively, the rays 640 may be projected from pre-defined mate points of the virtual object 330, or by another user defined criteria. A mating button 645 illustrated as a circle with a paperclip for this example in FIG. 6A is generated on the spatial mapping mesh 410 at a location on the mesh 410 intersected by a ray 640. The center position of the mating button 645 is the ray 640 intersection with the mesh 410 ("hit point") for each bounding box face. The normal vector of mating button 645 is the normal vector of the ray 640 hit point for each face 335a of the bounding box 335.

Figure 6B:
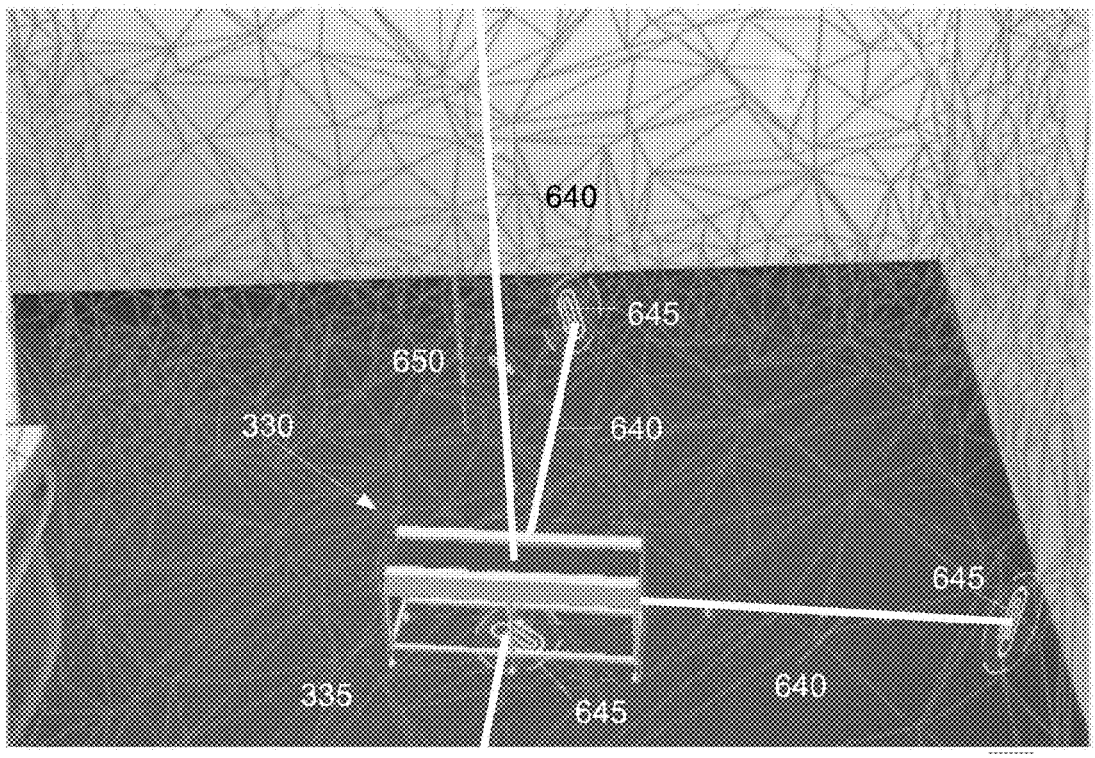
FIG. 6B illustrates a slider on a virtual ray of FIG. 6A.

If a mating button is generated, a corresponding offset ruler 640 is also generated and displayed along the corresponding ray, displaying a distance from the virtual object to the RW environment surface, as shown by block 242 (FIG. 2C), displayed as evenly spaced hash lines along the ruler 640. A start position of the ruler 640 is the center of the bounding box 335 for the virtual object 330. An end position of the ruler 640 is the center of the corresponding mating button 645. The unit distance spacing the hash lines on the ruler 640 in this example embodiment is 0.1 m, although different units may be either selected or defaulted according to the size of the virtual object 330 and/or the size of the VR environment. When the user gazes at a point of the ruler 640, a slider 650 (shown in green in FIG. 6B) appears at the position on the ruler gazed upon by the user.

Figure 7A:
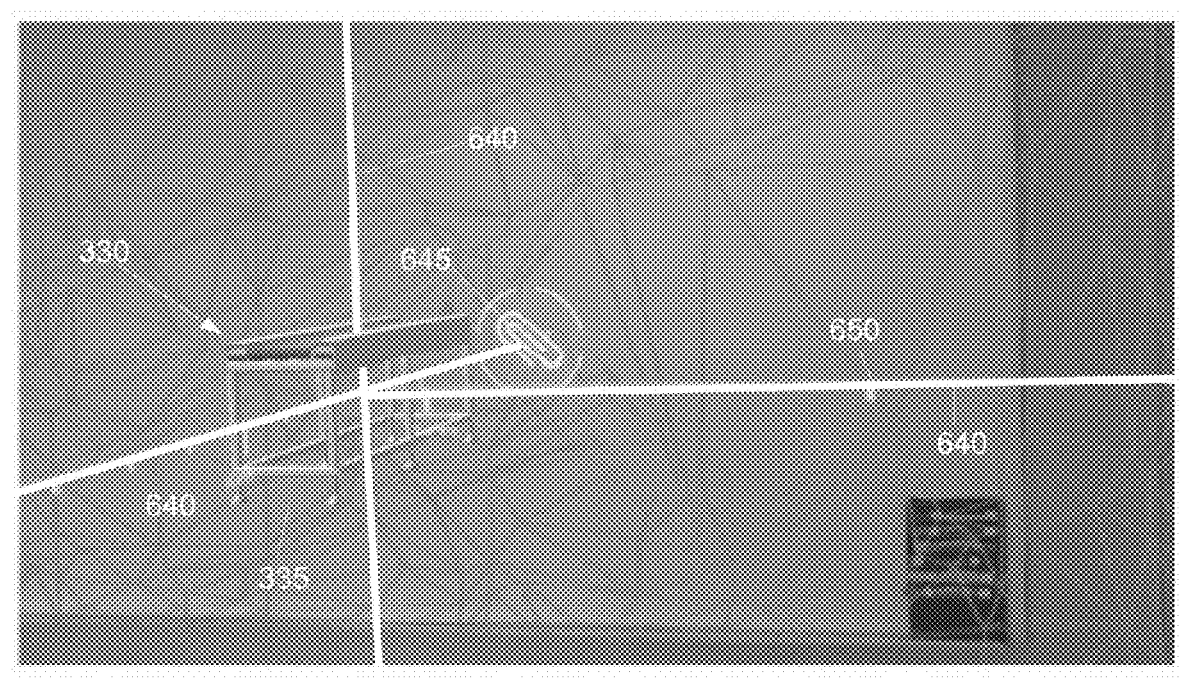
FIG. 7A illustrates a position of a virtual object before user selection of the mating button in the user interface of embodiments.
Figure 7B:
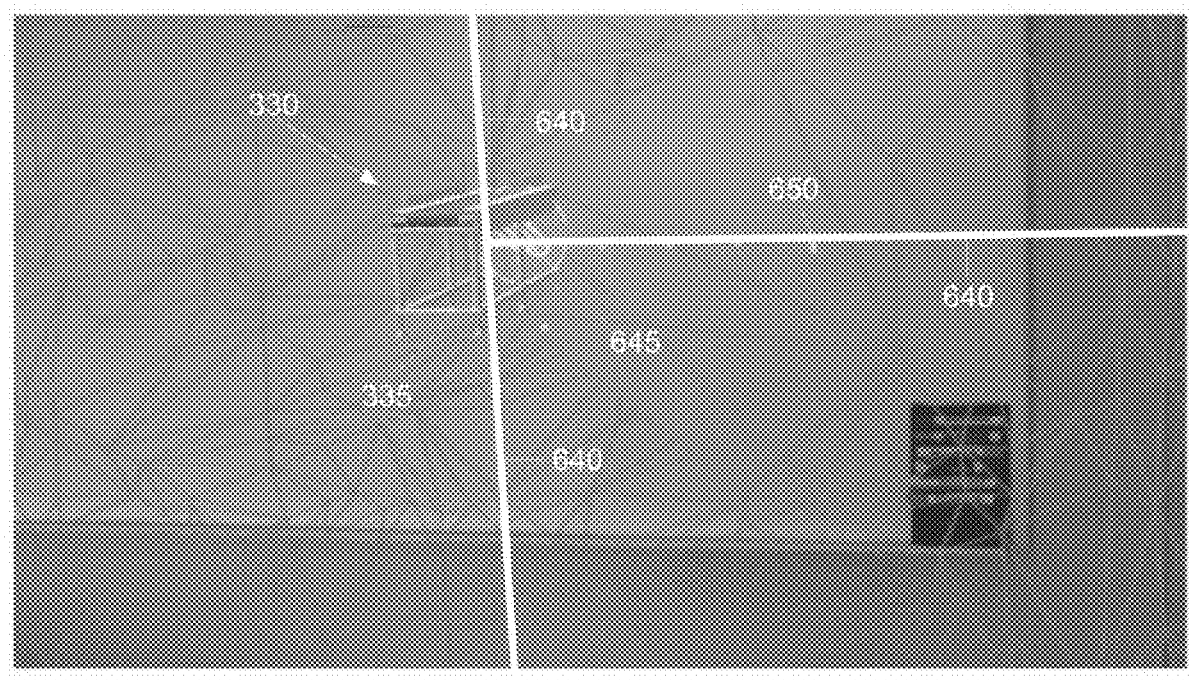
FIG. 7B illustrates a position of a virtual object after user selection of the mating button of FIG. 7A.

If the user selects generated mating button 645 at a mating point on the spatial mapping mesh 410 FIG. 7A, the virtual object 330 is moved so that the center position of the corresponding bounding box face 335a is aligned to the clicked center position of the mating button 645 and the virtual object 330 is rotated (if needed) so that a negative normal vector of the corresponding bounding box face 335a is equal to the normal vector of the selected mating button 645 (FIG. 7B). The end result is that the virtual object 330 is mated to the defined and desired point on the spatial mapping mesh 410, as shown by block 244 (FIG. 2C).

If the user clicks on a ruler slider handle 650 (FIG. 8A), as shown by block 246, the virtual object 330 is so moved so that the center position of the corresponding bounding box face 335a is aligned to the clicked center position of the ruler slider and the app rotates the virtual object so that the negative normal vector of the corresponding bounding box face 335a is equal to the normal vector of the corresponding mating button 645. The result is that the virtual object 330 is mated to a certain point of the spatial mapping mesh with certain offset distance (FIG. 8B) and the mate is complete, as shown by block 250.

As shown by block 260, after the mate is conducted, the user may continue to conduct other activities, but the mated relation will still be honored, as shown by block 270. For example, if the user chooses to change the scale of the model, the mated surface will still be mated, as shown by FIGS. 9A-9D.

The set up of the bounding box faces for a model is described below to provide a context for describing the interactions and calculations in the magnetic mate and shadow mate operations, which depend on the bounding box faces. FIGS. 10A-10D illustrate a simplified example of the elements referenced in the method of FIGS. 2A-2C regarding the magnetic mate and the shadow mate. Here, the virtual object (a Coke machine) has a six sided bounding box 335, with shadow mate offset rulers 1040 projecting from faces of the bounding box 335. The mating buttons 645 indicate where the rules (normal rays) end on the RW surface. A shadow mate offset slider handle 650 is shown on a ruler 1040 in FIG. 10D.

Figure 11:
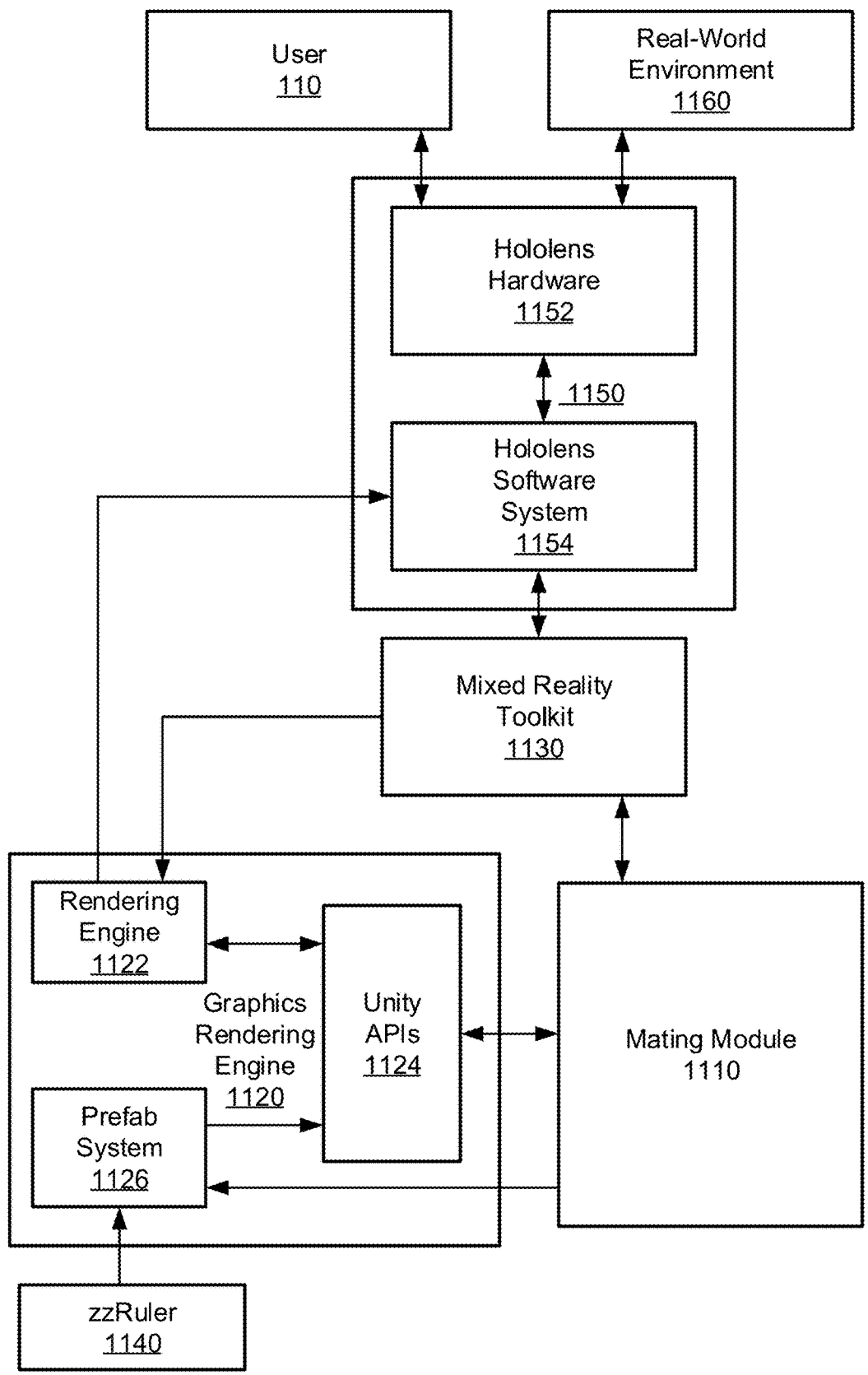
FIG. 11 is a block diagram of a first exemplary embodiment of a mixed reality system.

An exemplary system 1100 used to implement the exemplary method embodiments described herein may be a combination of off-the-shelf third party hardware/software (1120, 1130, 1140, 1150) and a custom mating module 1110 that interacts with the third party components to perform the exemplary method embodiments, as shown by FIG. 11. A user 110 uses a head mounted VR headset 1150 that is configured to scan the RW environment 1160. The VR headset 1150 interacts with a mixed reality toolkit 1130 and a graphics rendering engine 1120 to process input from the real-world environment and produce an eye image for rendering by the VR headset 1150. The mating module 1110 interacts with the mixed reality toolkit 1130 and the graphics rendering engine 1120 via APIs 1124 to provide the functionality of the embodiments described above in a manner described in further detail below.

Table 1 is a non limiting list of examples of preferred and alternative off-the-shelf third party hardware/software (1120, 1130, 1140, 1150) that interacts directly and/or indirectly with the mating module 1110.

TABLE 1

3<sup>rd</sup> Party Hardware/Software used with mating module.

| Element | Platform | Requirement for interaction | Preferred | Alternative |
|---|---|---|---|---|
| 1120 | Software | Any engine/system that supports Graphic Rendering and integration with Mixed Reality/Augmented Reality Platform | Unity 2018.4.8f1 | Unreal Engine |
| 1130 | Software | Any system that supports interaction with Mixed Reality/Augmented Reality Platform in the rendering engine (1120) | MixedRealityToolkit-Unity (HoloToolkit 2017.4.3.0 - Refresh) | Magic Leap Toolkit-Unity |
| 1140 | Software | Any system that provides the ability to create and manipulate a ruler object in the rendering engine (1120) | zzRuler 2.0 | Custom designed |
| 1150 | Hardware | Any hardware/system that supports scanning real physical environment | HoloLens 1 | HoloLens 2/ Magic Leap |

Implementation of the embodiments is described with reference to the preferred hardware/software in Table 1. A non-limiting list of examples of Unity APIs the mating module 1110 interacts with include camera, Physical.RaycastAll, Quaternion.LookRotation, Transform.position, Transform,position, and Transform.localScale, GameObject Instantiate, GameObject.Destroy, Vector3.Distance, Vector3.ProjectOnPlane, Math.Abs, and Mathf.Round APIs, among others. Similarly, the mating module 1110 interacts with the MixedReality Toolkit (MRTK) using, for example, the Input Module API (for click and focus events), the Solver Surface Magnetism API (to resolve magnetic mate target position/rotation), and the Spatial Mapping Manager (to start/stop spatial mapping), among others.

A third-party asset, UnityGLTF is used to load GLTF (graphics language (GL) transmission format) files input by user at runtime. UnityGLTF takes data from a GLTF file and creates an object in the scene, and then sets a BoxCollider component (including center and size data) for every sub-object. Thereafter, the system iterates through all sub-objects (for example, using a for loop) and calculates maximum and minimum point values for the bounding box 335 of the virtual object 330, as shown in Table 2:

TABLE 2

Calculating minimum and maximum points of virtual object bounding box.

```
public Vector3 GetMaxPoint( )
{
    Vector3 maxPoint = new Vector3(int.MinValue, int.MinValue,
    int.MinValue);
    foreach (var boxcollider in
gameObject.GetComponentsInChildren<BoxCollider>( ))
    {
        if (boxcollider.bounds.max.x > maxPoint.x)
        {
            maxPoint.x = boxcollider.bounds.max.x;
        }
        if (boxcollider.bounds.max.y > maxPoint.y)
        {
            maxPoint.y = boxcollider.bounds.max.y;
        }
        if (boxcollider.bounds.max.z > maxPoint.z)
        {
            maxPoint.z = boxcollider.bounds.max.z;
        }
    }
    return maxPoint;
}
public Vector3 GetMinPoint( )
{
    Vector3 minPoint = new Vector3(int.MaxValue, int.MaxValue,
    int.MaxValue);
    foreach (var boxcollider in
gameObject.GetComponentsInChildren<BoxCollider>( ))
    {
        if (boxcollider.bounds.min.x < minPoint.x)
        {
            minPoint.x = boxcollider.bounds.min.x;
        }
        if (boxcollider.bounds.min.y < minPoint.y)
        {
            minPoint.y = boxcollider.bounds.min.y;
        }
        if (boxcollider.bounds.min.z < minPoint.z)
        {
            minPoint.z = boxcollider.bounds.min.z;
        }
    }
    return minPoint;
}
```

The bounding box 335 max and min point of the virtual object 330 have been calculated, the center and size of the bounding box is determined, as shown by Table 3:

TABLE 3

Determining bounding box center and size.

```
void SetModelBoxCollider( )
{
    ModelCollider = gameObject.AddComponent<BoxCollider>( );
    GetComponent<BoxCollider>( ).size = new
        Vector3(Math.Abs(maxPoint.x −
minPoint.x), Math.Abs(maxPoint.y − minPoint.y),
Math.Abs(maxPoint.z − minPoint.z));
    GetComponent<BoxCollider>( ).center =
```

TABLE 3-continued

Determining bounding box center and size.

```
HostTransform.InverseTransformPoint((maxPoint + minPoint) / 2);
}
```

Based on the virtual object bounding box 335, six bounding box faces 335*a* may be determined, and a local scale, position and local rotation of the bounding box 335 is determined. Table 3 provides an example of determining the local scale, position, and local rotation of a bounding box face (here, the back face):

TABLE 4

Calculating parameters for a bounding box face.

```
//Back face
GameObject instantiatedBoundingboxFace1 =
Instantiate(importModelManager.BoundingboxFacePrefab, boundingboxElements.transform);
    instantiatedBoundingboxFace1.name = "BackFace";
    BoundingboxFace bboxFaceScript1 =
instantiatedBoundingboxFace1.AddComponent<BoundingboxFace>( );
    instantiatedBoundingboxFace1.transform.localScale = new
Vector3(modelBounds.size.x, modelBounds.size.y, 0.00001f);
    instantiatedBoundingboxFace1.transform.position = new
Vector3(modelBounds.center.x, modelBounds.center.y, modelBounds.center.z +
modelBounds.size.z / 2);
    instantiatedBoundingboxFace1.transform.Rotate(new Vector3(0, 180, 0));
    instantiatedBoundingboxFace1.GetComponent<Renderer>( ).enabled = false;
    boundingBoxFaceList[1] = bboxFaceScript1;
```

In a similar fashion, the parameters for all six bounding box faces are determined, shown in a sequence in Table 5:

TABLE 5

Bounding box faces

| Index | Face |
|---|---|
| 0 | Front Face |
| 1 | Back Face |
| 2 | Left Face |
| 3 | Right Face |
| 4 | Top Face |
| 5 | Bottom Face |

Table 5 includes three groups of paired parallel faces, {0,1}, {2,3}, and {4,5}. For each pair, each face has a bounding box face normal that is the opposite vector of the other face (mathematically, this means a vector is the negative of another vector). The properties of the sequence of Table 5 may be leveraged to simplify calculations in the magnetic mate and shadow mate methods.

As described above regarding FIGS. 2A and 2B, the magnetic mate process is used for initial alignment of a virtual object with a real-world environment. Briefly, a user selects the initial bounding box face to be used for the magnetic mate. The method employs a surface magnetism feature from a third-party tool (Mixed Reality Toolkit) to automatically align the bounding box face to the surface mesh area that the user is currently gazing at. The user air taps the virtual object to confirm the initial placement of the virtual object within the RW environment.

For example, the magnetic mate process may be implemented as follows. After the user 110 starts the magnetic mate, one extra bounding box face is created and its scale and position are set equal to the selected bounding box face, as shown by Table 6:

TABLE 6 creating, scaling, and creating a bounding box face for magnetic mate

```
InstantiatedMateFace =
Instantiate(importModelManager.BoundingboxFacePrefab);
    InstantiatedMateFace.name = "MateFace";
    InstantiatedMateFace.transform.localScale =
CurrMateModel.boundingBoxFaceList[SelectedBoundingBoxFaceIndex].transform.lossyScale
;
    InstantiatedMateFace.transform.position =
CurrMateModel.boundingBoxFaceList[SelectedBoundingBoxFaceIndex].transform.position;
```

Specifically for rotation, the opposite of the selected bounding box face is used, as shown by Table 7:

TABLE 7 rotation of selected bounding box face.

```
if (SelectedBoundingBoxFaceIndex % 2 == 0)
{
    InstantiatedMateFace.transform.rotation =
CurrMateModel.boundingBoxFaceList[SelectedBoundingBoxFaceIndex +
1].transform.rotation;
}
else
{
    InstantiatedMateFace.transform.rotation =
CurrMateModel.boundingBoxFaceList[SelectedBoundingBoxFaceIndex -
1].transform.rotation;
}
```

To easily move/rotate the virtual object, the parent of the virtual object is set to be the instantiated bounding box face 335a so that the position and rotation of the virtual is automatically handled by Unity, as shown by Table 8:

TABLE 8 selection of virtual object parent

```
InstantiatedMateFace.transform.parent = null;
CurrMateModel.HostTransform.parent = InstantiatedMateFace.transform;
```

During the magnetic mate, the position and rotation of the instantiated bounding box face is set equal to the Surface Magnetism pointer object, as shown by Table 9:

TABLE 9 initializing virtual object position and rotation

```
if (currMateModelState == MateModelState.MagneticMateState)
{
    if (InstantiatedMateFace != null)
    {
        InstantiatedMateFace.transform.position =
solverMagnetismPointer.transform.position;
        InstantiatedMateFace.transform.rotation =
solverMagnetismPointer.transform.rotation;
    }
}
```

In contrast with the shadow mate, the user may not use a click event to inform the mating module 1110 to place the virtual object, because the intent of surface magnetism is the virtual object 330 follows the position of the cursor. As a result of this, the cursor does not collide with the virtual object 330. The user click event provided via MRTK 1130 to the graphics rendering engine 1120 uses the cursor to collide with colliders so that the Unity Engine could detect the collision and fire the click event), so the mating module 1110 uses the data provided by cursor class and GazeManager class to detect that the user clicks something. The mating module 1110 clears any previous stored mated bounding box face 335a and store the latest one. Once the magnetic mate face is mated, magnetic mate mode is exited and instantiated bounding box face is destroyed, as shown by Table 10:

TABLE 10

Ending magnetic mate mode.

```
if (cursor.GetIsInputSourceDown( ) && (GazeManager.Instance.HitObject
!= null))
{
    if (SelectedBoundingBoxFaceIndex != -1)
    {
        CurrMateModel.ClearMatedBoundingBoxFaceIndexList( );
        CurrMateModel.matedBoundingBoxFaceIndexList[0] =
SelectedBoundingBoxFaceIndex;
        CurrMateModel.MatedBoundingBoxFaceIndexListIter = 1;
    }
    SetCurrMateModelState(MateModelState.DefaultMateState);
}
if (InstantiatedMateFace != null)
{
    Destroy(InstantiatedMateFace);
    InstantiatedMateFace = null;
}
```

As described above, in shadow mating mode the system calculates a virtual ray originating from the virtual object 330 and represents the virtual ray graphically to the user as a ruler 640. Locations where the virtual rays intersect with the spatial mating mesh 410 ("ray its") are determined and presented to the user as potential mating locations. The following describes the interaction between the mating module 1110 and the Unity engine 1120 under the first embodiment.

Figure 8A:
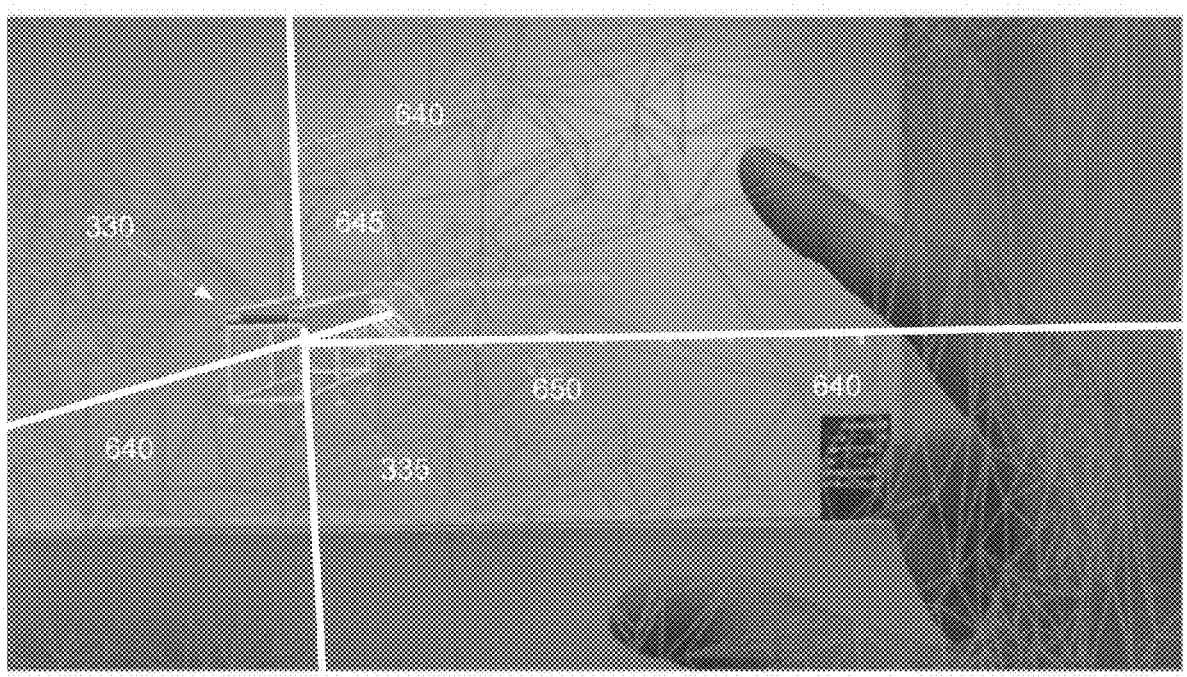
FIG. 8A illustrates a first position of the virtual object of the embodiments before interaction with the ruler slider handle.
Figure 8B:
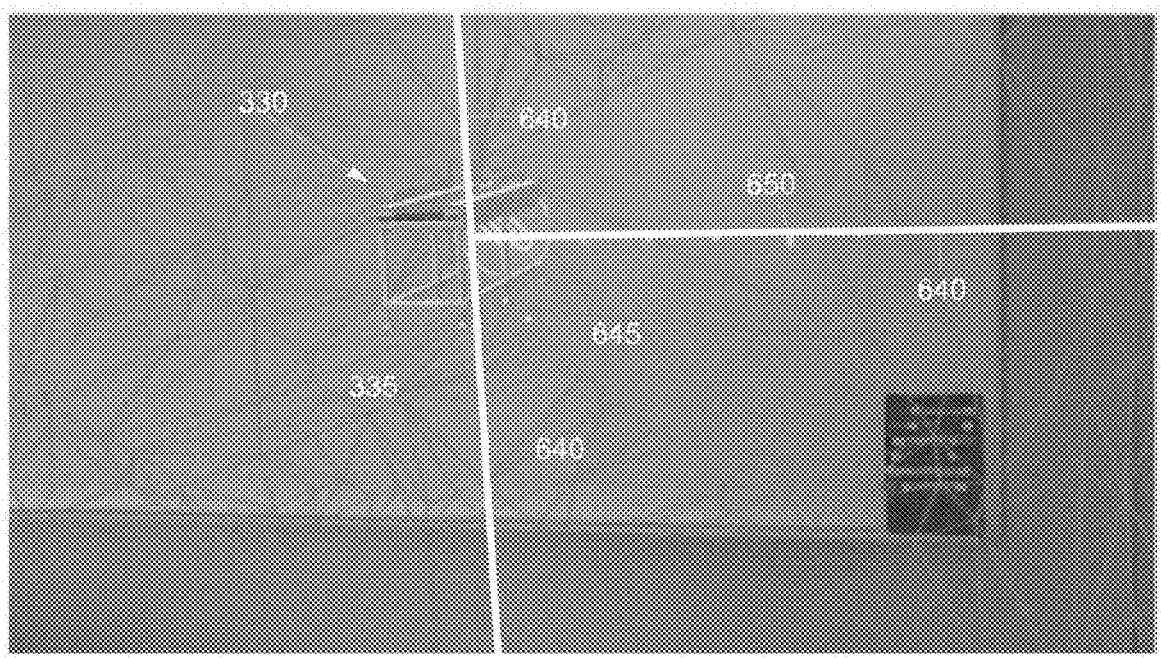
FIG. 8B illustrates a second position of the virtual object of the embodiments after interaction with the ruler slider handle.

When the Unity engine 1120 generating the spatial mapping mesh, the MixedRealityToolkit 1130 sets all the spatial mapping mesh in a "Spatial Mapping" rendering, visually providing the user a virtual representation of real physical environment, for example, as represented by a mesh of blue triangle in FIGS. 8A-8B.

The mating module 1110 sets the ray origin as a bounding box face center position, the ray direction as a bounding box face normal vector, a maxDistance as 100 meters and a layer mask as "Spatial Mapping," as shown by example code in Table 11:

TABLE 11

Mapping of ray hits

```
int layer_mask = LayerMask.GetMask("Spatial Mapping");
RaycastHit[ ] hits = Physics.RaycastAll(rayPos, rayDir, 100.0F,
layer_mask);
```

The Unity Engine API Physics.RaycastAll( ) returns a list of hit results to the mating module 1110, and extracts two data from the hit result (RaycastHit): RaycastHit.normal and RaycastHit.point. The mating module 1110 iterates through the ray hit results to find the closet hit result, which it adopts as the hit result, as shown by Table 12:

TABLE 12

Processing ray hit results

```
float minDistance = float.MaxValue;
int closetHit = 0;
for (int ind = 0; ind < hits.Length; ind++)
{
    float distance = Vector3.Distance(hits[ind].point, rayPos);
    if (distance < minDistance)
    {
        minDistance = distance;
        closetHit = ind;
    }
}
RaycastHit hit = hits[closetHit];
```

FIGS. 12A-12D show examples of virtual ray data structure provided to the Unity API. FIG. 12A shows an example of Physics.RaycastAll input ray origin position. FIG. 12B shows an example of Physics.RaycastAll input ray direction. FIG. 12C shows an example of Physics.RaycastAll output RaycastHit list (example point and normal of the hit result). FIG. 12D shows an example of hit point data (include normal and position) structure.

The virtual object may be rotated and/or translated to correspond to the normal vector of the hit point. This may be done with a gravity mode either enabled or disabled. The difference between gravity mode enabled and gravity mode disabled is with regard to setting the rotation of the virtual object: setting the position of the virtual object is the same whether gravity mode is enabled or disabled.

The mating module 1110 translates the virtual object 330 by adding a vector at the virtual object's starting point (the bounding box center position) and its ending point (the hit point position to the current position of the model), as shown by Table 13:

TABLE 13

Translating the virtual object

```
CurrMateModel.HostTransform.position + = targetPos −
CurrMateModel.boundingBoxFaceList[hitFaceIndex].transform.position;
```

When rotating the virtual object 330 with respect to the mate button 645, the specific face of the bounding box is considered. In a model class/script, an index of the Top Face and the bottom face is calculated and stored. The top face is defined as the bounding box face with a world position having the highest y-axis value, while the bottom face is defined as the bounding box face with a world position having the lowest y-axis value, as shown by Table 14. If there is more than one face with the same highest/lowest y-axis value, any one of them may be selected.

TABLE 14

Bounding box top/bottom faces

```
int topFaceIndex = CurrMateModel.TopFaceIndex;
int bottomFaceIndex = CurrMateModel.BottomFaceIndex;
```

If the mated bounding box face is the top face, vector (0, 1, 0) (up vector in world coordinate) is used as the input to Quaternion.FromToRotation. The final rotation result is that (0, 1, 0) becomes the normal vector of the mated bounding box face. So the mated bounding box face is horizontally aligned, as shown by Table 15:

TABLE 15

Horizontal alignment of bounding box top face

```
if (hitFaceIndex == topFaceIndex)
{
    CurrMateModel.HostTransform.rotation =
Quaternion.FromToRotation(CurrMateModel.boundingBoxFaceDirectionList[hitFaceI
ndex].normalized, new Vector3(0, 1, 0)) * CurrMateModel.HostTransform.rotation;
}
```

Similarly, if the mated bounding box face is the Bottom Face, vector (0, −1, 0) (up vector in world coordinate) is used as input to Quaternion.FromToRotation. The final rotation result is that (0, −1, 0) becomes the normal vector of the mated bounding box fac, as shown by table 16. So the mated bounding box face is also horizontally aligned.

TABLE 16

Horizontal alignment of bounding box bottom face

```
else if (hitFaceIndex == bottomFaceIndex)
{
    CurrMateModel.HostTransform.rotation =
Quaternion.FromToRotation(CurrMateModel.boundingBoxFaceDirectionList[hitFaceI
ndex].normalized, new Vector3(0, -1, 0)) * CurrMateModel.HostTransform.rotation;
}
```

If the mated bounding box face is neither Top Face nor Bottom Face, the mating module 1110 calculates the projection vector of the hit normal vector on the horizontal plane (as a plane whose normal vector is (0, 1, 0), up vector in world coordinate) using Vector3.ProjectOnPlane, then the returned projection vector is used as input to Quaternion.FromToRotation. This ensures the mated bounding box face is vertically aligned, as shown by Table 17.

TABLE 17

Vertical alignment of bounding box mated face

```
else
{
    Vector3 projectedNormal = Vector3.ProjectOnPlane(-1 *
boundingBoxFaceRayHits[hitFaceIndex].normal, new Vector3(0, 1, 0));
    CurrMateModel.HostTransform.rotation =
Quaternion.FromToRotation(CurrMateModel.boundingBoxFaceDirectionList[hitFaceI
ndex].normalized, projectedNormal) * CurrMateModel.HostTransform.rotation;
}
```

Figures 13A, 13B:
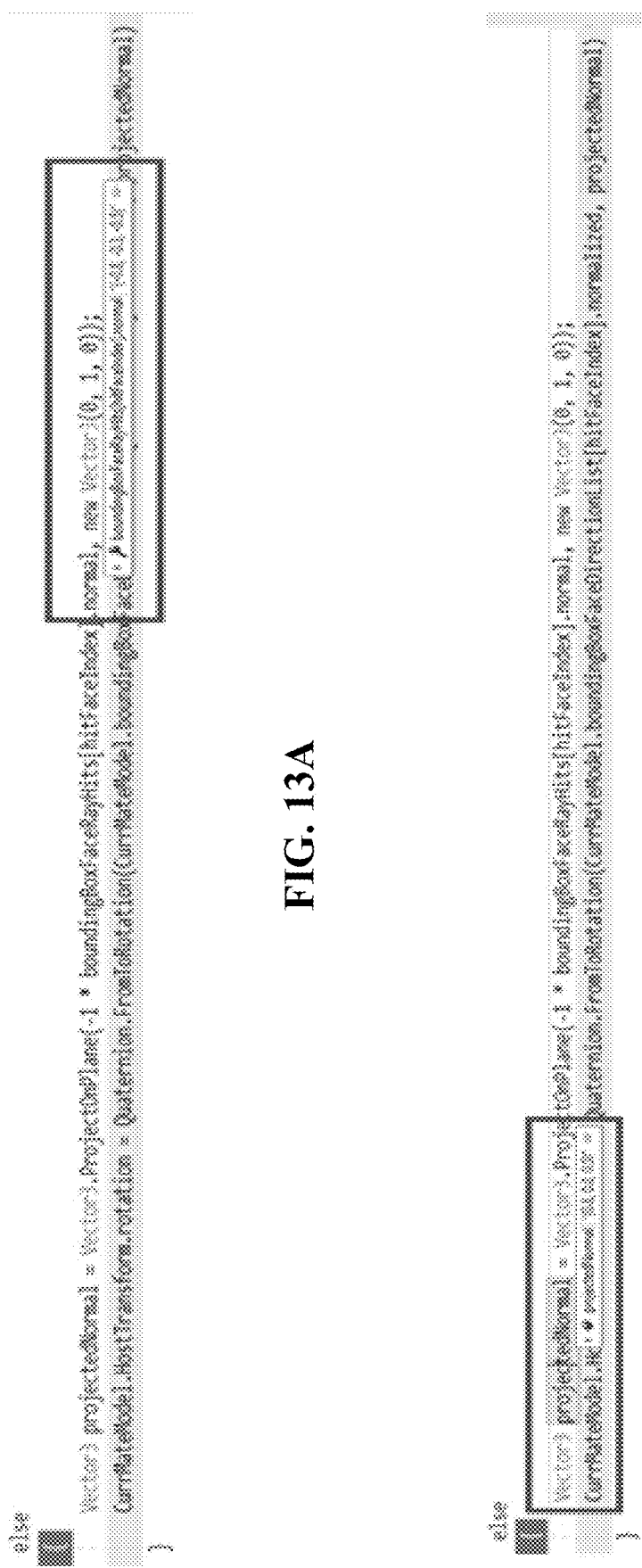
FIG. 13A. is a screenshot showing an example of Vector3.ProjectOnPlane input data.
FIG. 13B. is a screenshot showing an example of Vector3.ProjectOnPlane output data.

FIG. 13A. is a screenshot showing an example of Vector3.ProjectOnPlane input data.

FIG. 13B. is a screenshot showing an example of Vector3.ProjectOnPlane output data.

If gravity mode is disabled, the mating module uses the bounding box face normal vector as the first input and the negative (opposite) hit point normal vector as the second input to Quaternion.FromToRotation and receives the output value of Quaternion as returned value. The returned Quaternion value is multiplied with the current rotation value (also as Quaternion value) of the model, as shown by FIG. 18.

TABLE 18

Virtual object rotation.

```
Quaternion neededRotation =
Quaternion.FromToRotation(CurrMateModel.boundingBoxFaceDirectionList[hitFaceIndex].
normalized, -1 * boundingBoxFaceRayHits[hitFaceIndex].normal) *
CurrMateModel.HostTransform.rotation;
```

Lastly, the current rotation value is set to the multiply result value, as per Table 19.

TABLE 19

Virtual object rotation (continued).

```
CurrMateModel.HostTransform.rotation = neededRotation;
```

As noted above, the mating module generates a ruler overlaying the bounding box rays to facilitate user manipulation of the virtual object within the RW environment.

Initially, in MateModelManager script/class, a list offsetMateIndicators stores six offsetMateIndicator objects. Only one virtual object is mated during the mate process so each offsetMateIndicator corresponds to one bounding box face. The bounding box 335 is rectangular so it has six bounding box faces 335a, and the corresponding length of list offsetMateIndicators is also six. Upon startup or exit from shadow mate mode, the mating module 1110 destroys any existing offsetMateIndicator so the list offsetMateIndicators store 6 NULL value at that point. The mating module creates a unity prefab that includes a ruler, a mate button and a slider in default positions and rotations. Based on the ray hit result as described above, the mating module generates two different kinds of indicators: hit indicator and a no hit indicator. For the hit indicator, if the corresponding value in the list offsetMateIndicators is NULL, the Unity Engine API Instantiate is used to instantiate the prefab and store the object in the list offsetMateIndicators. The position is set to the RaycastHit.point. Note that rotation of the offsetMateIndicator is not addressed at this point. If the corresponding value in the list offsetMateIndicators is not NULL, it means there is a offsetMateIndicator. Because the user may move/rotate/scale the model, the Spatial Mesh is constantly updating in certain frequency (for example, once every 3 seconds), the position and rotation of the offsetMateIndicator is also updated every frame based on the hit result.

The ruler includes two objects: a simple line, and markers, including distance markers (shown as hash lines) and numbers that are handled by the zzRuler third party asset. The marker module sets the RulerLine starting position to be the bounding box face center position and the end position to be the ray hit position, as shown by Table 20:

TABLE 20

Setting ruler end points

```
RulerLine.GetComponent<LineRenderer>( ).SetPosition(0, rayPos);
RulerLine.GetComponent<LineRenderer>( ).SetPosition(1, hit.point);
```

The mating module 1110 does not need to set the position of the ruler 640 at this point because when offsetMateIndicator prefab is created the local position of the ruler 640 is initialized to 0. So that when the position of offsetMateIndicator is set to the ray hit position, the ruler 640 is automatically placed at the right position.

The scale of the ruler 640 is set equal to the distance between the bounding box face 335*a* center position and the ray hit position so that the mating module 1110 builds a complete ruler from the bounding box face center position and the ray hit position, as shown by Table 21:

TABLE 21

Scaling the ruler.

Ruler.transform.localScale = Vector3.Distance(rayPos, hit.point);

The mating module 1110 sets the rotation to the Quaternion.LookRotation (bounding box face normal) when instantiating the offsetMateIndicator. The mating module 1110 uses Quaternion.LookRotation so that the second part of the ruler 640 is orthogonal to the bounding box face 335*a*, as shown by Table 22:

TABLE 22

Rotating the ruler.

Ruler.transform.rotation = Quaternion.LookRotation(rayDir);

The mate button 645 is initialized similarly. When the mating module 1110 creates the offsetMateIndicator prefab, the mating module 1110 initializes the local position of the mate button 645 to be 0. When the mating module 1110 sets the position of offsetMateIndicator to the ray hit position as described previously, the ruler is automatically placed at the right position.

The mating module 1110 sets the rotation of the mate button 645 according to Quaternion.LookRotation (ray hit normal). The mating module 1110 uses Quaternion.LookRotation so that the mate button 645 represents the hit normal visually, as shown by Table 23

TABLE 23

Rotation of the mate button.

MateHitTarget.transform.rotation = Quaternion.LookRotation(hitNormal);

A slider object corresponding to the ruler slider handle 650 (FIG. 8A) contains two objects: a interactable (clickable) green capsule and a text that displays a help information and distance information. The slider may be set to either active status or inactive status, depending upon on two conditions. The slider 650 is set to active status if the user is looking at the ruler 640, otherwise the slider 650 is set to inactive status. The slider 650 is position granularity (precision) is determined by the distance from the ray hit position to the user staring position. This may determine, for example, if the ruler position is displayed as an integer a floating point representation on the ruler, for example, 0.1 m, 0.2 m, . . . , 3 m, 3.1 m, . . . , 4 m, . . . .

The ruler 640 has a collider component to detect collisions. In every frame, the mating module 1110 sets the user head position, head direction, and max distance to 10 meters as input to Physics.Raycast and receives the output as hitRulerInfo. If the output is valid, the mating module 1110 checks if the object has the tag "measureslider." If so, this indicates the user is looking at the ruler 640. The mating module 1110 further checks the precision. If the precision meets the requirements described above, the mating module 1110 sets the slider 650 active, as shown by Table 24:

TABLE 24

Ruler slider

```
RaycastHit hitRulerInfo;
Vector3 headPos = Camera.main.transform.position;
    Vector3 headForwardVec = Camera.main.transform.forward;
    if (Physics.Raycast(headPos, headForwardVec, out hitRulerInfo,
    10))
    {
        if (hitRulerInfo.collider.CompareTag("measureslider") &&
Mathf.Round(Vector3.Distance(hitRulerInfo.point, transform.position) *
10f) * 0.1f > 0)
        {
            SetSlider(hitRulerInfo);
        }
    }
    else
    {
        slider.SetActive(false);
    }
```

After setting the slider active, the mating module 1110 set the position, rotation and distance text to display correct distance, as follows. The mating module 1110 calculates the distance between user gazing hit position and position of offsetMateIndicator as previously described and then calls Mathf.Round and Math.Abs to calculate the rounded distance, as per

TABLE 25

Setting the slider active

```
private void SetSlider(RaycastHit hitRuler)
    {
        float distance = Vector3.Distance(hitRulerInfo.point,
        transform.position);
        SliderValue = Mathf.Round(Math.Abs(distance * 10f)) / 10f;
        slider.SetActive(SliderValue > 0);
```

The mating module 1110 sets the slider position according to the position of offsetMateIndicator plus the vector that is calculated as the rounded distance multiplying the forward vector of offsetMateIndicator, as shown by Table 26:

TABLE 26

Setting the slider position.

slider.transform.position = transform.position + SliderValue * transform.forward;

The mating module 1110 sets the rotation of the slider equal to the rotation of ruler. For better user experience, if needed, if the angle between the user's head direction and the forward vector of the slider is greater than 90 degrees, it means user is on the back side of the slider. The mating module 1110 rotates the slider 180 degrees around itself, so the slider is always facing the user, as shown by Table 27:

TABLE 27

Setting the slider rotation.

```
slider.transform.rotation = ruler.transform.rotation;
Vector3 headForwardVec = Camera.main.transform.forward;
if (Math.Abs(Vector3.Angle(headForwardVec.normalized,
slider.transform.forward.normalized)) > 90)
{
    slider.transform.Rotate(0, 180, 0, Space.Self);
}
Lastly, set the distance text to the distance calculated and round it
to 1 decimal.
    distanceTextMesh.text = distance.ToString("F1") + " m";
}
```

Figure 10A:
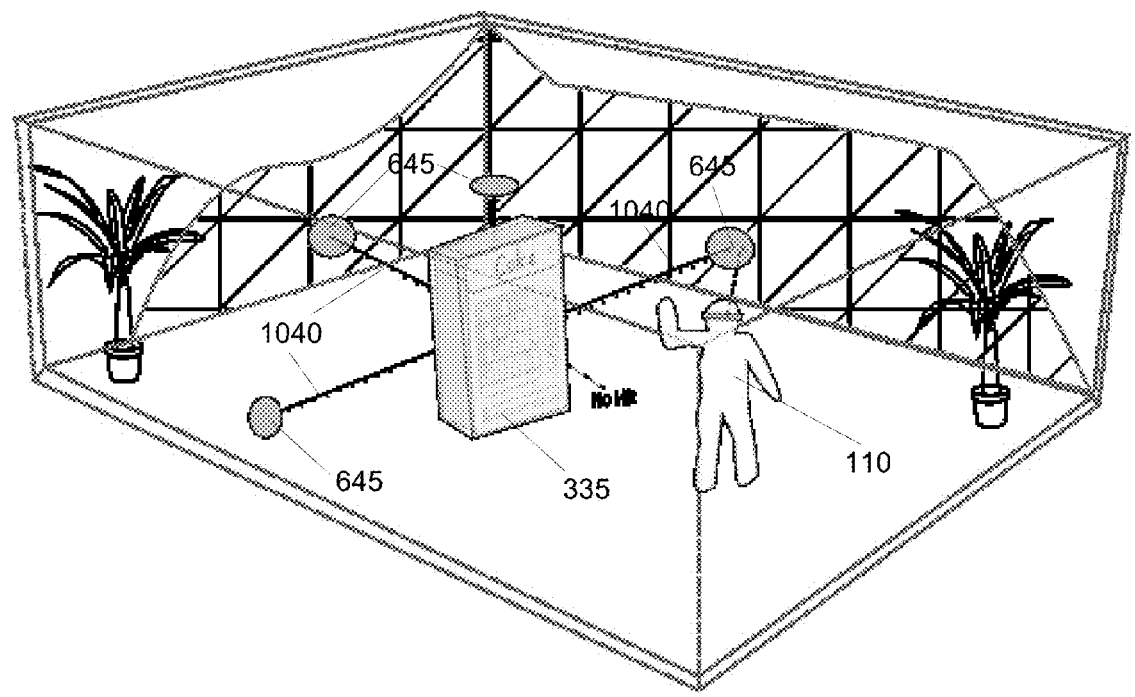
FIGS. 10A-D illustrate a simplified example of the elements referenced in the method of FIGS. 2A-2C regarding the shadow mate.
Figure 10B:
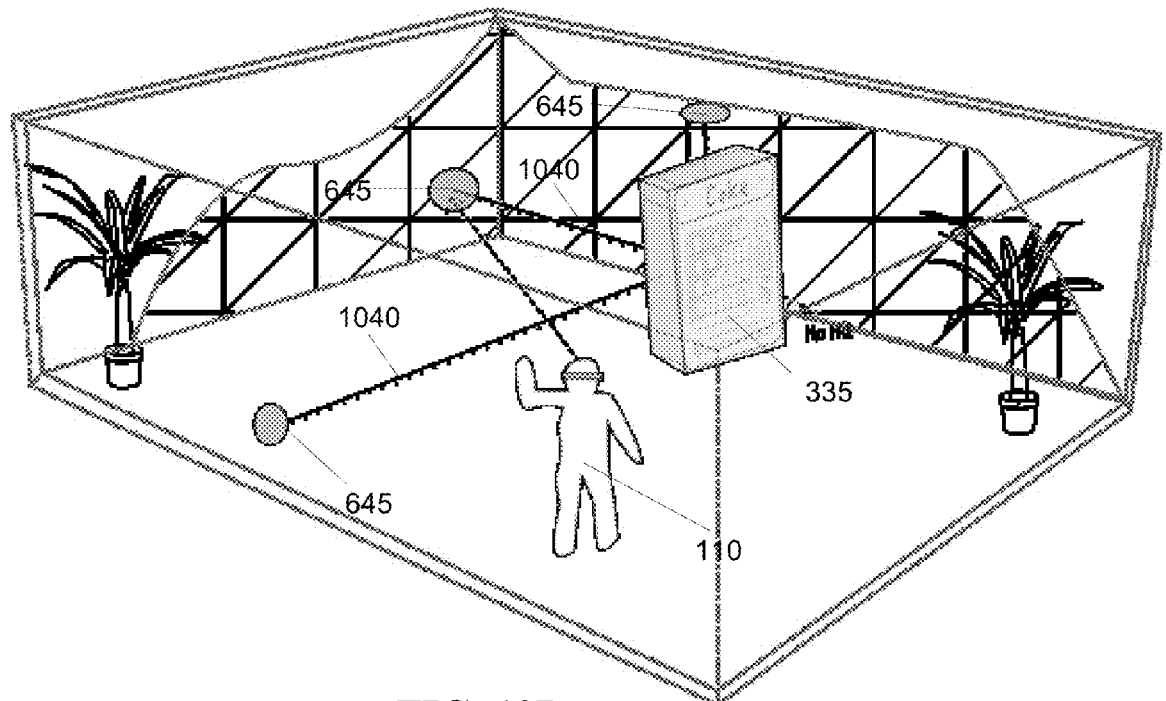
Figure 10C:
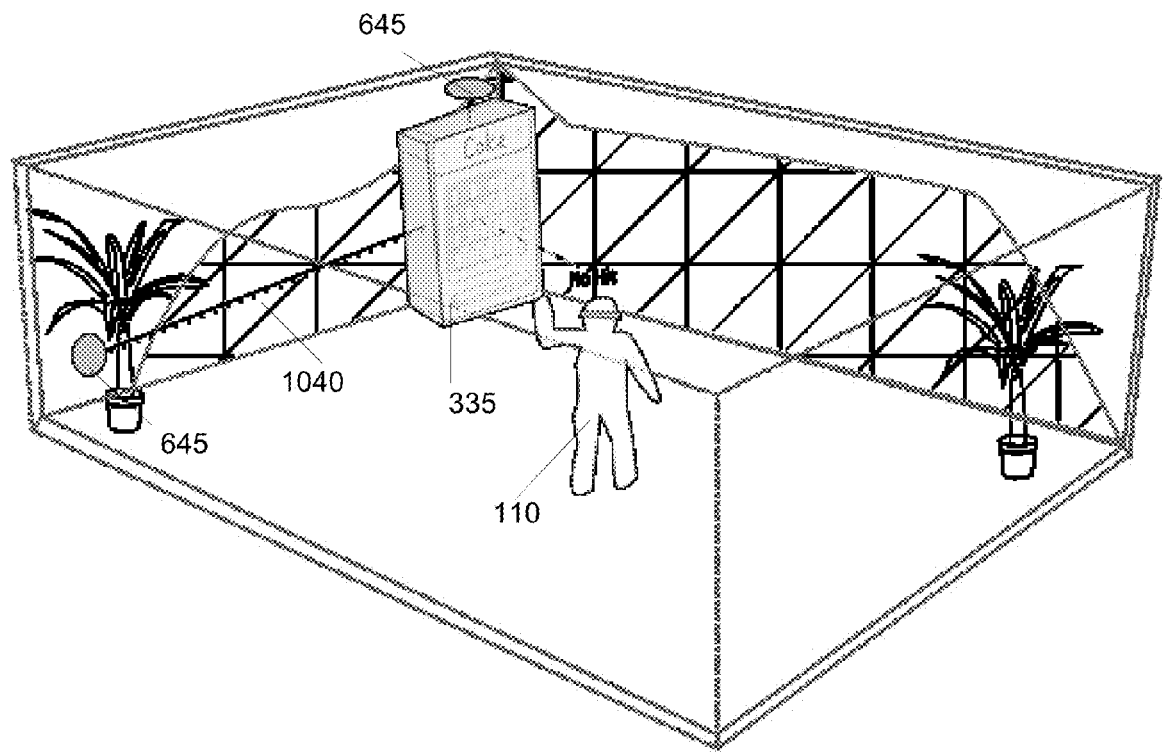
Figure 10D:
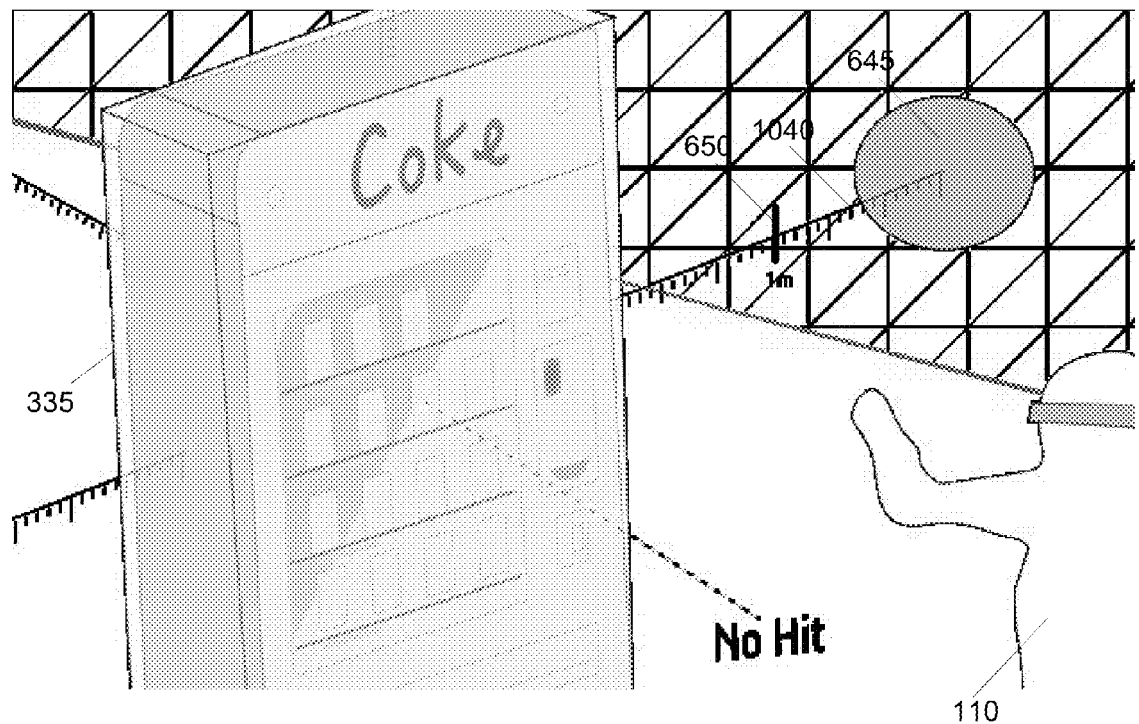

An invalid hit result indicates the ray does not intersect with the spatial mapping layer. Here, the mating module 1110 uses the Unity Engine API Instantiate to create no hit indicator, displaying a dotted line and a text, as shown by FIG. 10D.

As with the hit indicator, for every frame, if the offsetMateIndicators list at that index does not store anything, an offsetMateNoHitIndicatorPrefab is instantiated, as show in Table 28:

TABLE 28

Instantiation a no-hit indicator.

```
if (offsetMateIndicators[i] == null)
{
    offsetMateIndicators[i] =
    Instantiate(offsetMateNoHitIndicatorPrefab);
}
```

If a previous hit indicator was stored, it is destroyed and replaced by a newly created no hit indicator, as shown by Table 29:

TABLE 29

Replacing a mate indictor with a no-hit indicator.

```
else if ((offsetMateIndicators[i] != null) &&
    (offsetMateIndicators[i].tag ==
"offsetmatehitindicator"))
{
    Destroy(offsetMateIndicators[i]);
    offsetMateIndicators[i] =
    Instantiate(offsetMateNoHitIndicatorPrefab);
}
```

Then the mating module 1110 sets the no-hit indicator position to the bounding box face center and the rotation to Quaternion.LookRotation (normal of bounding box face), as shown by Table 30:

TABLE 30

Set no-hit indicator rotation

```
offsetMateIndicators[i].transform.position = rayPos;
offsetMateIndicators[i].transform.rotation =
Quaternion.LookRotation(rayDir);
```

The mating module 1110 further maintains alignment of the virtual object with the mate points when the virtual object is resized, and addresses issues where the resizing would conflict with one or more mate points. When the virtual object is loaded, the mating module 1110 calculates and store the corresponding real size bounding box center. For all 6 bounding box faces, the mating module 1110 calculates and stores the local center position, local scale, and rotation.

After user is satisfied with the mate result the mate mode exits. When the user subsequently wishes to scale the virtual object, for example by clicking a scale button, ff the virtual object is already represented in real size, nothing more is done. If the virtual object is not in real size, the virtual object may be scaled. Here, the current world positions of the mated bounding box faces are stored, as shown by Table 31:

TABLE 31 storing pre-scale bounding box parameters.

```
List<Vector3> positionsBeforeScaleList = new List<Vector3> { };
    foreach (int ind in matedBoundingBoxFaceIndexList)
    {
        if (ind != −1)
        {
positionsBeforeScaleList.Add(boundingBoxFaceList[ind].transform.position);
        }
    }
```

The mating module 1110 scales the virtual object around its bounding box center to real size, as shown by Table 32:

TABLE 32

Scaling the virtual object.

```
ScaleAroundPivot(HostTransform, BoundingboxCenterPosition,
intermediateScaleFactor);
```

At this point if the bounding box 335 of the virtual object conflicts with one or more mated points, the next two steps are used to address this. The current world position of the mated bounding box faces is stored, as per Table 33:

TABLE 33

Store bounding box position after scaling.

```
List<Vector3> positionsAfterScaleList = new List<Vector3> { };
    foreach (int ind in matedBoundingBoxFaceIndexList)
    {
        if (ind != -1)
        {
positionsAfterScaleList.Add(boundingBoxFaceList[ind].transform.position);
        }
    }
```

For every mated bounding box face, the mating module 1110 calculates the position difference between before scaling around the bounding box center and after scaling around the bounding box center, then applies all these position differences to the virtual object. In this case, the virtual object is scaled to real size and keeps the mate alignment, as shown by Table 34:

TABLE 34

Revert to real size.

```
int scaleListIter = 0;
for (int i = 0; i < matedBoundingBoxFaceIndexList.Length; i++)
{
    if (matedBoundingBoxFaceIndexList[i] != -1)
    {
        HostTransform.position + =
        positionsBeforeScaleList[scaleListIter] -
positionsAfterScaleList[scaleListIter];
        scaleListIter++;
    }
}
```

Figure 14:
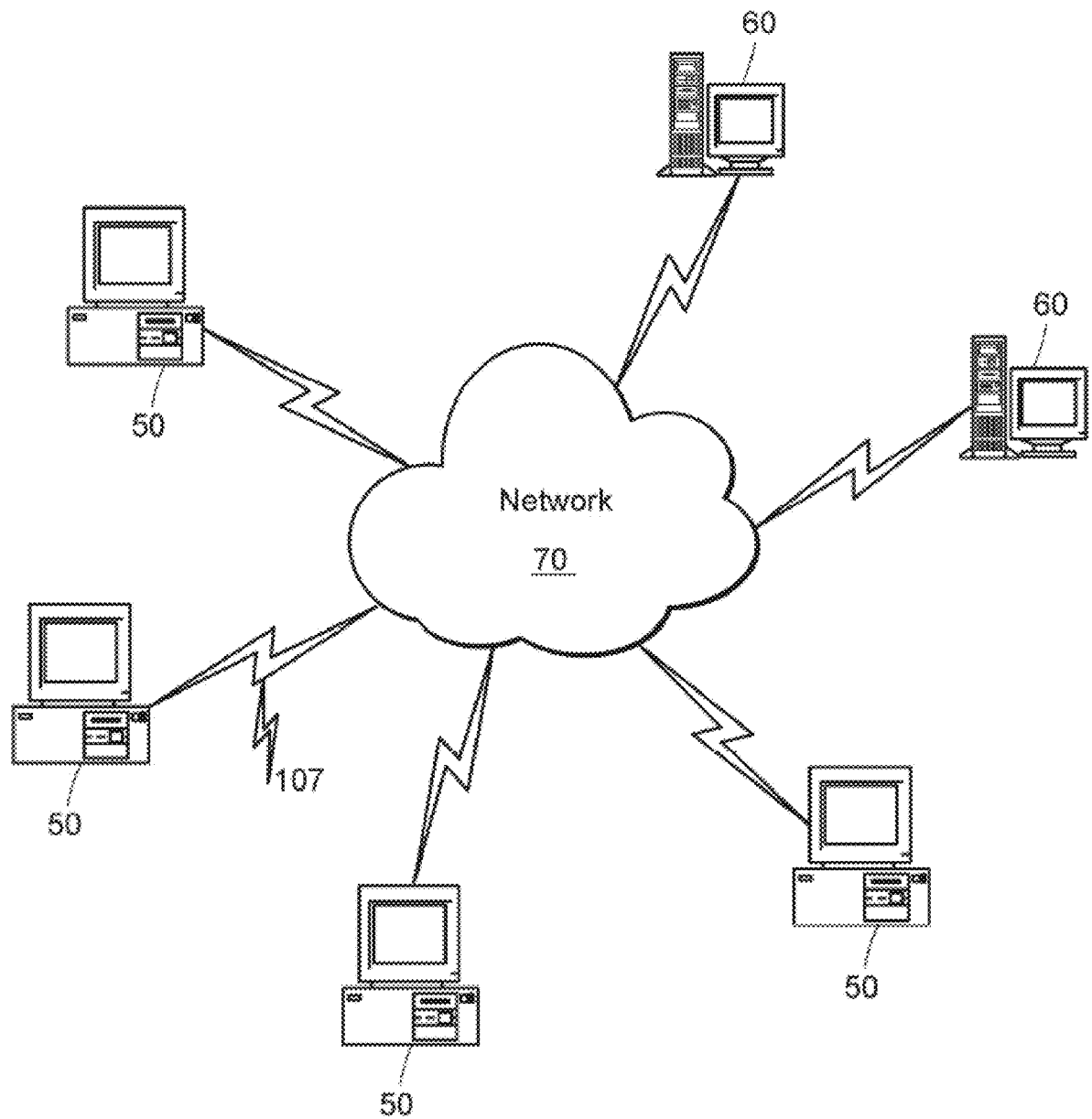
FIG. 14 is a schematic view of a computer network supporting embodiments of the present invention.

FIG. 14 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

Figure 15:
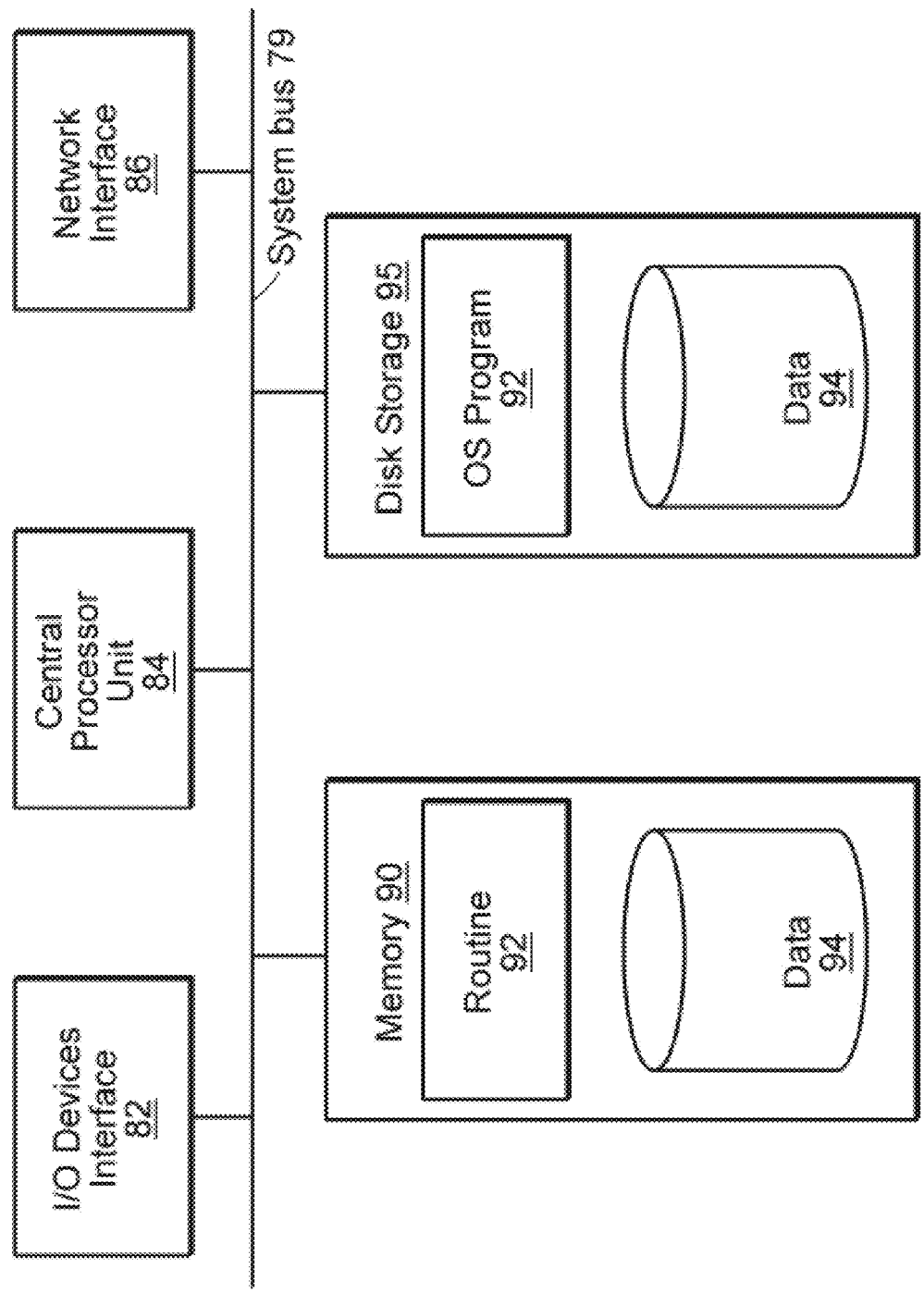
FIG. 15 is a block diagram of a computer device/node of FIG. 14.

FIG. 15 is a diagram of the internal structure of a computer (e.g., client processor/device 50 or server computers 60) in the computer system of FIG. 14. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 14). Memory 90 provides volatile storage for computer software instructions 92 and data 94 used to implement an embodiment of the present invention (e.g., code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

In other embodiments, the program product 92 may be implemented as a so called Software as a Service (SaaS), or other installation or communication supporting end-users.

While example embodiments have been particularly shown and described, it will be understood by those skilled in the art that various changes in form and details may be made therein without departing from the scope of the embodiments encompassed by the appended claims.

Possible practical uses of the embodiments described above include but are not limited to:

(1) Fit Check of Machinery
(2) Floor Plan and Layout

Possible benefits of this invention include but are not limited to:

(1) Making it easier and more comfortable for users to conduct mating in the physical environment;
(2) Minimize the number of clicks and time taken to perform mating and distance adjustments; and
(3) Increasing accuracy in mating virtual objects to real world environments.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer based method for mating virtual objects in virtual reality environment to a real world environment in proximity to a user of a virtual reality device in a mixed reality environment, comprising the steps of:
generating a bounding box comprising a plurality of faces corresponding to a plurality of exterior surfaces of a subject virtual object;
generating a spatial mesh corresponding to a plurality of surfaces of the real world environment;
providing a magnetic mate initially aligning a subject virtual object bounding box first face to a first spatial mesh surface;
providing a shadow mate between a subject virtual object bounding box second face toward a second spatial mesh surface, further comprising the steps of:
projecting a virtual ray from the subject virtual object bounding box second face toward the second spatial mesh surface;
determining a mate point corresponding to an intersection of the virtual ray and the second spatial mesh surface; and
displaying a mating button in the virtual reality environment at the mate point; and
displaying a ruler along the virtual ray mating button in the virtual reality environment at the mate point,
wherein the ruler further comprises a first end point on the subject virtual object bounding box second face and a second endpoint at the mate point.

2. The method of claim 1, wherein the ruler further comprises a scale indicating units of distance between the first end point and the second end point.

3. The method of claim 1, further comprising the step of displaying a sliding handle on the ruler at a midpoint between the first point and the second end point.

4. The method of claim 3, wherein displaying the sliding handle on the ruler is conditioned upon detecting a gaze of the user directed toward the ruler.

5. The method of claim 4, further comprising the step of translating a position of the virtual object along a path parallel to the ruler according to a user manipulation of the sliding handle along the ruler.

6. The method of claim 1, further comprising the step of:
based on a user action indicating a selection of the mate point, translating and/or rotating the virtual object according to the mate point and the magnetic mate.

7. The method of claim 6, further comprising the step of:
scaling a size of the virtual object with respect to the mate point and the magnetic mate, wherein the scaling avoids the virtual object intersecting with the spatial mesh.

8. The method of claim 6, further comprising the step of aligning the virtual object with the real world surface according to an orientation of the virtual object second face and an orientation of the second spatial mesh surface.

9. A system (1100) for mating virtual objects in virtual reality environment to a real world environment in proximity to a user of a virtual reality device in a mixed reality environment, comprising:
a virtual reality headset subsystem comprising:
a virtual reality headset comprising sensors to sense real-world environment data; and
a virtual reality headset software driver;
a computer based graphics rendering engine configured to receive the real-world environment data and render a subject virtual object and a spatial mesh comprising graphical representation of the real-world environment for the virtual reality headset subsystem; and
a mating module configured to interact with the graphics rendering engine and the virtual reality headset subsystem, the mating module comprising a processor and a memory configured to store non-transient instructions that when executed by the processor, perform the steps of:
generating a bounding box comprising a plurality of faces corresponding to a plurality of exterior surfaces of the subject virtual object;
providing a magnetic mate configured to initially align a subject virtual object bounding box first face to a first spatial mesh surface; and
providing a shadow mate between a subject virtual object bounding box second face toward a second spatial mesh surface, further comprising the steps of:
projecting a virtual ray from the subject virtual object bounding box second face toward the second spatial mesh surface;
determining a mate point corresponding to an intersection of the virtual ray and the second spatial mesh surface; and
displaying a mating button in the virtual reality environment at the mate point; and
a ruler module configured to perform the steps of providing a ruler along the virtual ray mating button in the virtual reality environment at the mate point,
wherein the ruler further comprises a first end point on the subject virtual object bounding box second face and a second endpoint at the mate point.

* * * * *